US009491421B2

(12) United States Patent
Morimoto

(10) Patent No.: US 9,491,421 B2
(45) Date of Patent: Nov. 8, 2016

(54) IMAGE PICKUP UNIT AND ELECTRONIC APPARATUS

(71) Applicant: Sony Corporation, Tokyo (JP)

(72) Inventor: Rui Morimoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/875,035

(22) Filed: Oct. 5, 2015

(65) Prior Publication Data

US 2016/0073066 A1 Mar. 10, 2016

Related U.S. Application Data

(63) Continuation of application No. 14/347,132, filed as application No. PCT/JP2012/075102 on Sep. 28, 2012, now Pat. No. 9,172,877.

(30) Foreign Application Priority Data

Oct. 6, 2011 (JP) ................................. 2011-221976

(51) Int. Cl.
| | |
|---|---|
| H04N 5/232 | (2006.01) |
| H04N 9/04 | (2006.01) |
| G03B 11/00 | (2006.01) |
| G02F 1/1347 | (2006.01) |

(Continued)

(52) U.S. Cl.
CPC .......... *H04N 9/045* (2013.01); *G02F 1/13473* (2013.01); *G03B 11/00* (2013.01); *G06T 5/20* (2013.01); *H04N 5/23277* (2013.01); *H04N 9/646* (2013.01); *H04N 2209/043* (2013.01)

(58) Field of Classification Search
CPC ...................... H04N 5/23277; H04N 5/35572
See application file for complete search history.

(56) References Cited

U.S. PATENT DOCUMENTS

| | | | | |
|---|---|---|---|---|
| 5,689,317 A | * | 11/1997 | Miller ................. | G02F 1/13473 349/80 |
| 6,002,476 A | * | 12/1999 | Treado ...................... | G01J 3/44 356/301 |
| 6,204,901 B1 | * | 3/2001 | Knox .................. | G02F 1/13473 349/117 |

(Continued)

FOREIGN PATENT DOCUMENTS

| | | |
|---|---|---|
| JP | 2006-140167 | 6/2006 |
| JP | 2006-165352 | 6/2006 |

(Continued)

OTHER PUBLICATIONS

Office Action issued in JP Application 2011221976, mailed Sep. 24, 2015 (5 pages).

*Primary Examiner* — James Hannett
(74) *Attorney, Agent, or Firm* — K&L Gates LLP

(57) ABSTRACT

There is provided an image pickup unit capable of suppressing occurrence of false color and color mixture and acquiring a color image with high image quality. The image pickup unit includes: an image sensor including a plurality of pixels and acquiring an image pickup data; a variable filter provided on a light receiving face of the image sensor, and transmitting a selective wavelength; and a filter drive section (a wavelength selection circuit and a system control section) driving the variable filter and thereby setting its transmission wavelength. By acquiring the image pickup data while time-divisionally switching the transmission wavelength of the variable filter, pixel data corresponding to the transmission wavelength of the variable filter are acquired in a temporally-successive manner.

20 Claims, 17 Drawing Sheets

(51) Int. Cl.
  *G06T 5/20* (2006.01)
  *H04N 9/64* (2006.01)

(56) References Cited

U.S. PATENT DOCUMENTS

| | | | |
|---|---|---|---|
| 2007/0236757 A1* | 10/2007 | Stewart | H04N 5/2254 358/509 |
| 2009/0027518 A1 | 1/2009 | Kita | |
| 2009/0086323 A1 | 4/2009 | Nobuyuki | |
| 2012/0127301 A1 | 5/2012 | Imai | |
| 2012/0127334 A1* | 5/2012 | Imai | G06T 7/408 348/223.1 |
| 2012/0127335 A1* | 5/2012 | Imai | H04N 9/735 348/223.1 |
| 2012/0268618 A1* | 10/2012 | Imai | H04N 5/232 348/222.1 |
| 2013/0063624 A1* | 3/2013 | Lin | H01L 27/14645 348/231.99 |

FOREIGN PATENT DOCUMENTS

| | | |
|---|---|---|
| JP | 2008-072337 | 3/2008 |
| JP | 2008-216478 | 9/2008 |
| JP | 2008-244833 | 10/2008 |
| JP | 2009-033222 | 2/2009 |
| JP | 2009-080356 | 4/2009 |
| JP | 2011-055135 | 3/2011 |
| JP | 2011-143155 | 7/2011 |

* cited by examiner

IMAGE PICKUP UNIT AND ELECTRONIC APPARATUS

CROSS REFERENCES TO RELATED APPLICATIONS

The present application is a continuation of U.S. application Ser. No. 14/347,132, filed on Mar. 25, 2014, which is a National Stage Entry of International Application No. PCT/JP2012/075102 filed on Sep. 28, 2012, which claims priority to Japanese Priority Patent Application No. JP 2011-221976 filed in the Japan Patent Office on Oct. 6, 2011, the entire content of which is hereby incorporated by reference.

BACKGROUND

The present disclosure relates to an image pickup unit that may be preferable, for example, for color photography, and to an electronic apparatus including this.

Generally, in an imaging device (an image pickup unit) that shoots a color image, a color filter that has a predetermined color arrangement is provided on an image sensor that includes a plurality of pixels, and the color image is synthesized using image pickup data that are dispersed space-divisionally. Specifically, for example, a filter that may selectively transmit color light of one of R (red), G (green), and B (blue) is provided on the image sensor for each pixel. As a color arrangement of R, G, and B in this case, for example, Bayer arrangement is typical.

On the other hand, as a measurement unit that utilizes spectroscopy, for example, a measurement unit that may include, on an optical detection device, for example, a variable filter that selectively transmits a specific wavelength is used (for example, Patent Literatures 1 to 4). As the variable filter, a so-called liquid crystal Lyot filter can be mentioned in which a transmission wavelength may be variable by voltage drive, for example.

SUMMARY

Generally, an image pickup unit for color photography may use, for example, a filter in which regions are separately painted with the use of respective pigments of R, G, and B as the above-described color filter, and allows color light of one of R, G, and B to be selectively transmitted in each region. Therefore, color light of only one color of R, G, and B is allowed to be detected in one pixel. In particular, in an image corresponding to a subject that has a large contrast difference, degradation in image quality such as so-called false color and color mixture may be easily caused as a result of an image arithmetic processing.

Therefore, it is desirable to provide an image pickup unit capable of suppressing occurrence of false color and color mixture and acquiring a color image with high image quality, and to provide an electronic apparatus that includes this.

An image pickup unit of an embodiment of the present disclosure includes: an image pickup device including a plurality of pixels and outputting an image pickup data; a variable filter provided on a light receiving face of the image pickup device, and configured to allow a selective transmission wavelength of incident light to be variable; and a filter drive section driving the variable filter and thereby time-divisionally switching the transmission wavelength.

An electronic apparatus of an embodiment of the present disclosure includes the image pickup unit of the above-described embodiment of the present disclosure.

In the image pickup unit of an embodiment of the present disclosure, the filter drive section drives the variable filter and time-divisionally switches its transmission wavelength. Accordingly, in the image pickup device, image data of colors corresponding to transmission wavelengths of the variable filter are outputted in a temporally-successive manner.

According to the image pickup unit of an embodiment of the present disclosure, the filter drive section drives the variable filter, and time-divisionally switches its transmission wavelength. Therefore, in the image pickup device, it is possible to output, in a temporally-successive manner, the image data of colors corresponding to the transmission wavelengths of the variable filter as the image pickup data. By generating a color image based on such image pickup data, it is possible to suppress occurrence of false color and color mixture, and to acquire a color image with high image quality.

Additional features and advantages are described herein, and will be apparent from the following Detailed Description and the figures.

DETAILED DESCRIPTION

Hereinafter, some modes for carrying out the present disclosure will be described with reference to the drawings. It is to be noted that the description will be given in the following order.
1. Embodiment (an example in which a transmission wavelength (R, G, B) of a variable filter provided on an image sensor is switched time-divisionally)
2. Modification 1 (another example of time-divisional drive for R, G, B, and near-infrared rays, and of image processing)
3. Modification 2 (another example of the image sensor)
4. Modification 3 (another example of the variable filter (a liquid crystal Lyot filter))
5. Modification 4 (an example in which a piezoelectric Fabry-Perot interferometer is used for the variable filter)
6. Application Example (an example of an electronic apparatus)

Embodiment

[Configuration]

Figure 1:
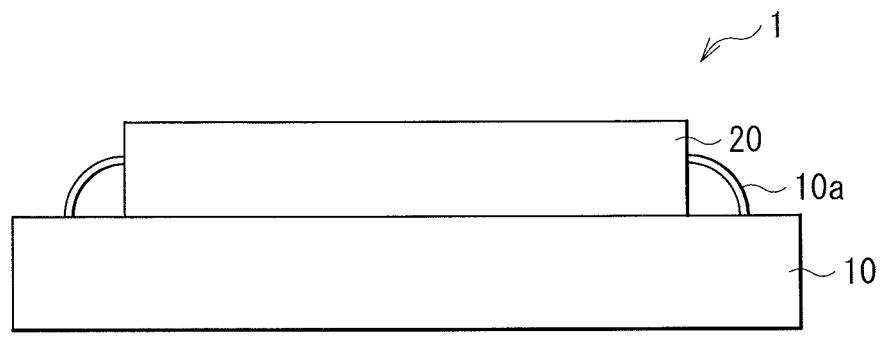
FIG. 1 is a schematic diagram illustrating an outline configuration of an image pickup unit according to an embodiment of the present disclosure.

FIG. 1 illustrates a general configuration of an image pickup unit (an image pickup unit 1) according to an embodiment of the present disclosure. The image pickup unit 1 is an image pickup unit that is suitable for shooting a color image (a still image or a moving image). The image pickup unit 1 includes a variable filter 20 that is provided on a light receiving face of an image sensor 10 (image pickup device). The variable filter 20 is connected, via a wiring 10a, to an electronic circuit (a wavelength selection circuit 21 which will be described later) that is formed in the image sensor 10.

[Functional Block Configuration, Circuit Configuration]

Figure 2:
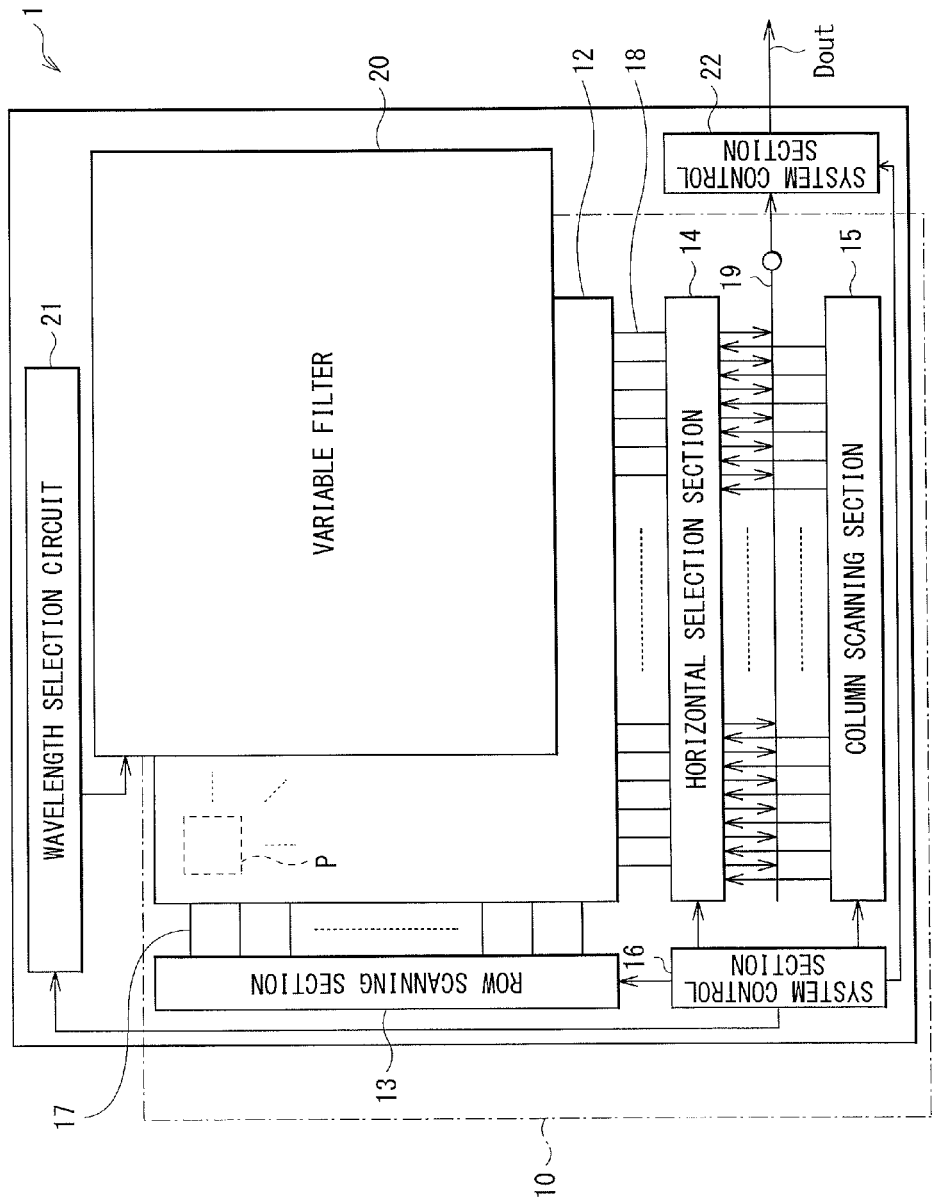
FIG. 2 is a functional block diagram of the image pickup unit shown in FIG. 1.

FIG. 2 illustrates a functional block configuration of the image pickup unit 1. In the image pickup unit 1, the image sensor 10 includes a pixel array section 12 on a substrate 11. Around this pixel array section 12, circuit sections (for example, a row scanning section 13, a horizontal selection section 14, a column scanning section 15, and a system control section 16) for driving the pixel array section 12 are arranged. The variable filter 20 is provided on the image sensor 10 to face the pixel array section 12. The variable filter 20 is connected to the wavelength selection circuit 21 formed on the substrate 10. The image pickup unit 1 also includes an image processing section 22 on the substrate 11.

The image sensor 10 may be configured, for example, of a solid-state image pickup device such as a CMOS (Complementary Metal Oxide Semiconductor). The pixel array section 12 is to be an image pickup area in the image pickup unit 1. In this pixel array section 12, pixels P (hereinafter, may be simply described as "pixel" in some cases) are arranged two-dimensionally in a matrix that each include a photoelectric conversion element (a photodiode 111A which will be described later) that generates a photoelectric charge of an electric charge amount in accordance with a light amount of incident light and accumulates the generated photoelectric charge therein. For example, three wirings (specifically, a row selection line 171, a reset control line 172, and a transfer line 173 which will be described later) may be connected, as pixel drive lines 17, to the pixel P. The pixel drive lines 17 transmit drive signals for reading signals. It is to be noted that, in FIG. 1, these pixel drive lines 17 are shown as one wiring for simplification. Further, a vertical signal line 18 for transmitting the read signals is further connected to the pixel P. A configuration of this pixel array section 12 will be described later.

The column scanning section 13 is configured of a shift resistor, an address decoder, etc. The column scanning section 13 is a pixel drive section that may drive the respective pixels P in the pixel array section 12, for example, in a row unit basis. Signals outputted from the respective unit pixels in the pixel row that has been selectively scanned by the row scanning section 13 are supplied to the horizontal selection section 14 via the respective signal lines 18. The horizontal selection section 14 is configured of an amplifier, a horizontal selection switch, etc. that are provided for each vertical signal line 18.

The column scanning section 15 is configured of a shift resister, an address decoder, etc. The column scanning section 15 sequentially drives the respective horizontal selection switches in the horizontal selection section 14 while scanning the respective horizontal selection switches. Through this selective scanning by the column scanning section 15, the signals for the respective pixels that are transmitted via the respective vertical signal lines 18 are sequentially outputted to a horizontal signal line 19, and are transmitted to outside of the substrate 11 via the horizontal signal line 19.

The variable filter 20 has a function as a so-called band pass filter that selectively transmits light with a specific wavelength (for example, any wavelength or wavelength band in a range from 0.3 μm to 2.5 μm). A transmission wavelength of this variable filter 20 is allowed to be switched by electric or mechanical control. In the present embodiment, the image pickup unit 1 is used as an imaging device for color photography. Therefore, this variable filter 20 serves as a color filter that allows switching between the color light of three primary colors of R, G, and B, and transmits the respective color light. A specific configuration of this variable filter 20 will be described later.

The wavelength selection circuit 21 is an electronic circuit for setting (selecting) the transmission wavelength of the above-described variable filter 20. This wavelength selection circuit 21 may be controlled by the system control section 16 arranged in the image sensor 10. This wavelength selection circuit 21 may include, for example, transistors (transistors Tr5 to Tr7 which will be described later) for applying signal voltages to respective liquid crystal cells in the above-described variable filter 20. Further, although detailed description will be given later, the wavelength selection circuit 21 may time-divisionally switch the variable filter 20, for example, on a pixel region unit basis, on a pixel column (row) unit basis, or on an all-pixel unit (plane unit) basis. A circuit configuration of this wavelength selection circuit 21 will be described later. It is to be noted that this wavelength selection circuit 21 and the system control section 16 correspond to specific examples of the filter drive section in the present disclosure.

The image processing section 22 performs a predetermined arithmetic processing with the use of image pickup data acquired in the image sensor 10, and may output, for example, color image data Dout. A specific image processing operation of this image processing section 22 will be described later.

The system control section 16 receives a clock supplied from the outside of the substrate 11, data that instructs an operation mode, etc., and controls operations of the image sensor 10, the wavelength selection circuit 21, and the image processing section 22. The system control section 16 may be configured, for example, of a microcomputer, etc. Specifically, the system control section 16 includes a timing generator that generates various timing signals. The system control section 16 performs drive control of the row scanning section 13, the horizontal selection section 14, the column scanning section 15, and the wavelength selection circuit 21, based on the timing signals generated by the timing generator. Also, the system control section 16 outputs the image pickup data from the horizontal signal line 19 to the image processing section 22, and drives the image processing section 22.

It is to be noted that the circuit portions configured of the row scanning section 13, the horizontal selection section 14, the column scanning section 15, the wavelength selection circuit 21, and the system control section 16 may be formed directly on the substrate 11, or may be arranged on an outside control IC. Also, the circuit portion may be formed on another substrate connected by a cable, etc.

[Pixel Circuit]

Figure 3:
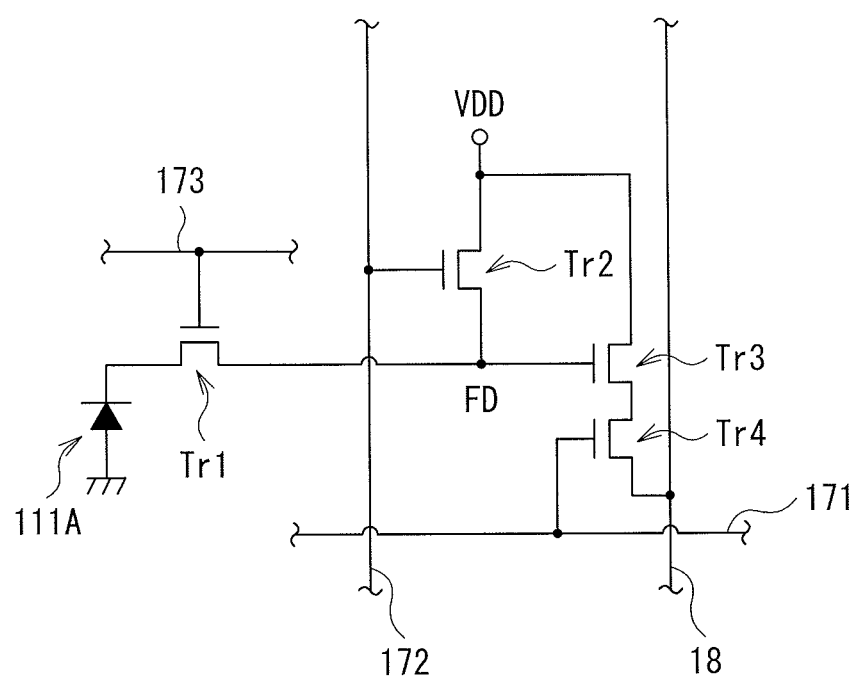
FIG. 3 is an equivalent circuit diagram of a pixel circuit in an image sensor.

FIG. 3 is an example of a circuit configuration of the pixel P that includes the photodiode 111A. The pixel P may include, for example, the photodiode 111A (the photoelectric conversion element), four transistors Tr1, Tr2, Tr3, and Tr4, the above-described vertical signal line 18, and the pixel drive lines 17 (the row selection line 171, the reset control line 172, and the transfer line 173). As the pixel drive lines 17, for example, three drive wirings that are the row selection line 171, the reset control line 172, and the transfer line 173 may be connected to each pixel P in such a manner that the three drive wirings are common to the respective pixels in the same pixel row. Each of one ends of the row selection line 171, the reset control line 172, and the transfer line 173 is connected to an output end corresponding to each pixel row of the row scanning section 13 in a pixel row unit basis.

Each of the transistors Tr1 to Tr4 may be, for example, an N-channel-type field effect transistor, and may be configured using, for example, a silicon-based semiconductor such as microcrystalline silicon, crystalline silicon, or polycrystalline silicon. Alternatively, oxide semiconductor such as indium-gallium-zinc oxide (InGaZnO) or zinc oxide (ZnO) may be used.

The transistor Tr1 is a transfer transistor. A gate of the transistor Tr1 is connected to the transfer line 173, one end of a source and a drain thereof is connected to one end (for example, a cathode) of the photodiode 111A, and the other end thereof is connected to an FD (a floating diffusion). A transfer pulse φTRF which is active at a high level (for example, a Vdd level) (hereinafter, described as "high-active") is supplied to the gate of the transistor Tr1 via the transfer line 173. Accordingly, the transistor Tr1 becomes an ON state, and the transistor Tr1 transfers, to the FD, the photoelectric charge that has been subjected to photoelectric conversion in the photodiode 111A.

The transistor Tr2 is a reset transistor. A gate of the transistor Tr2 is connected to the reset control line 172, one end of a source and a drain thereof is connected to a pixel power source Vdd, and the other end thereof is connected to the FD. A high-active reset pulse φRST is supplied to the gate of the transistor Tr2 via the reset control line 172. Accordingly, the transistor Tr2 becomes an ON state, and the transistor Tr2 resets the FD by discarding the electric charge that has been accumulated in the FD to the pixel power source Vdd, before the transfer of the signal electric charge from the photodiode 111A to the FD.

The transistor Tr3 is an amplifier transistor. A gate of the transistor Tr3 is connected to the FD, one end of a source and a drain thereof is connected to the pixel power source Vdd, and the other end thereof is connected to the transistor Tr4. This transistor Tr3 outputs an electric potential of the FD after being reset as a reset signal (a reset level) Vreset. The transistor Tr3 also outputs an electric potential of the FD after the transfer of the signal electric charge as a light accumulation signal (a signal level) Vsig.

The transistor Tr4 is a selection transistor. A gate of the transistor Tr4 is connected to the row selection line 171, one of a source and a drain thereof is connected to the transistor Tr3, and the other end thereof is connected to the vertical signal line 18. A high-active selection pulse φSEL is supplied to the gate of the transistor Tr4 via the row selection line 171. Accordingly, the transistor Tr4 becomes an ON state, and relays a signal outputted from the transistor Tr3 to the vertical signal line 18 while allowing the pixel P to be in a selected state. It is to be noted that this transistor Tr4 may be connected between the pixel power source Vdd and the drain of the transistor Tr3. Further, the transistor Tr3 may also serve as the transistor Tr4. In other words, a circuit configuration that has three transistors may be adopted.

One end (for example, an anode) of the photodiode 111A may be connected, for example, to ground (GND). The photodiode 111A converts received light into a photoelectric charge of an electric charge amount corresponding to the amount of the received light. The other end (for example, the cathode) of the photodiode 111A is electrically connected to the gate of the transistor Tr3 via the transistor Tr1 and the FD. A sensitivity range (a received light wavelength band) of this photodiode 111A may be in a range, for example, from 0.3 μm to 20 μm. This photodiode 111A is allowed to perform photoelectric conversion on a wavelength in such a range. This photodiode 111A generates a signal electric charge of an electric charge amount in accordance with a light amount (a received light amount) of incident light by receiving a reference electric potential at the cathode side thereof. In the present embodiment, as will be described later, the variable filter 20 selectively transmits light of three wavelengths of R (red: for example, from 620 nm to 750 nm), G (green: for example, from 495 nm to 570 nm), and B (blue: for example, from 450 nm to 495 nm), and a color image is generated based on pixel data corresponding to the respective color light. Therefore, it is enough for the photodiode 111A to be sensitive to a wavelength (for example, about 380 nm to 750 nm) corresponding to visible light rays that include wavelengths of R, G, and B. As such a photoelectric conversion material, for example, polycrystalline silicon, crystalline silicon, microcrystalline silicon, amorphous silicon, etc. can be mentioned.

[Wavelength Selection Circuit 21]

Figure 4:
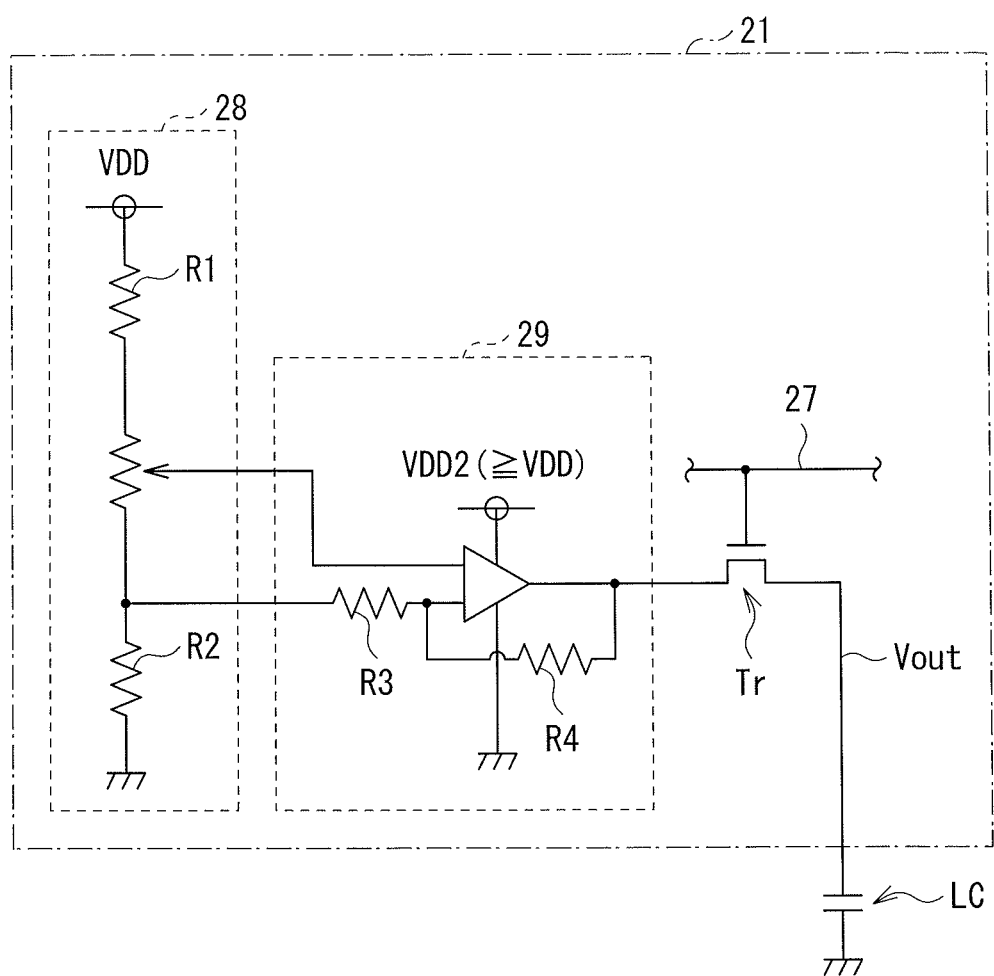
FIG. 4 is an equivalent circuit diagram of a wavelength selection circuit shown in FIG. 1.

FIG. 4 is an example of a circuit configuration of the wavelength selection circuit 21. The wavelength selection circuit 21 includes a transistor Tr and an electronic circuit. The transistor Tr is for applying a signal voltage Vout to a liquid crystal cell LC that configures the variable filter 20. The electronic circuit is configured of an operational amplifier 28 and a digital potentiometer 29 that are for setting the signal voltage Vout. A gate of the transistor Tr is connected to a selection line 27 for transmitting a timing control signal from the system control section 16. One of a source and a drain of the transistor Tr is connected to an output terminal of the operational amplifier 28, and the other thereof is connected to an electrode (an electrode 23a1, 23b1, or 23c1 which will be described later) of the liquid crystal cell LC. It is to be noted that, as will be described later, in the present embodiment, the variable filter 20 includes three liquid crystal cells 20A to 20C. The transmission wavelength is time-divisionally set (switched) in accordance with a combination of signal voltages φ1, φ2, and φ3 that are separately applied to these liquid crystal cells 20A to 20C. Therefore, the above-described circuit is provided for each of the liquid crystal cells 20A to 20C (or, for each cell unit U which will be described later), and the corresponding transistors Tr5 to Tr7 applies the signal voltages φ1, φ2, and φ3 at selective timings. It is to be noted that, in FIG. 4, the liquid crystal cell LC corresponds to one of the liquid crystal cells 20A to 20C, the transistor Tr corresponds to one of the transistors Tr5 to Tr7, and the signal voltage Vout corresponds to one of the signal voltages φ1, φ2, and φ3.

It is to be noted that, in this example, an arbitrary signal voltage Vout is allowed to be set by digital signal control using the digital potentiometer 29. In a case having such a configuration, it is possible to perform correction in correspondence with characteristic variations at the time of manufacturing by adjusting the signal voltage Vout. Alternatively, it is possible to set the transmission wavelength at the time of shooting to an arbitrary wavelength. For example, it may be possible to switch the transmission wavelength at the time of shooting to a wavelength (such as infrared rays or ultraviolet rays) other than R, G, and B. Further, in this example, a voltage of output of the digital potentiometer 29 is adjusted by the operational amplifier 28, and this is set as the signal voltage Vout. However, the operational amplifier 28 and the digital potentiometer 29 may be provided as necessary. For example, when the transmission wavelength of the variable filter 20 is set to a fixed value, and application thereof is also limited, it is enough that the signal voltage Vout is a fixed value. Therefore, in this case, it is possible to adopt a circuit configuration in which the above-described digital potentiometer 29 is not provided. Further, when voltages higher than the voltage supplied by the system control section 16 are necessary as the signal voltages φ1, φ2, and φ3, a high voltage power source may be provided separately, or the higher voltages may be supplied from outside. Alternatively, amplification effect may be improved by using output from a charge pump circuit, etc. as a power source VDD2 of the operational amplifier 28.

[Cross-Sectional Configuration]

Figure 5:
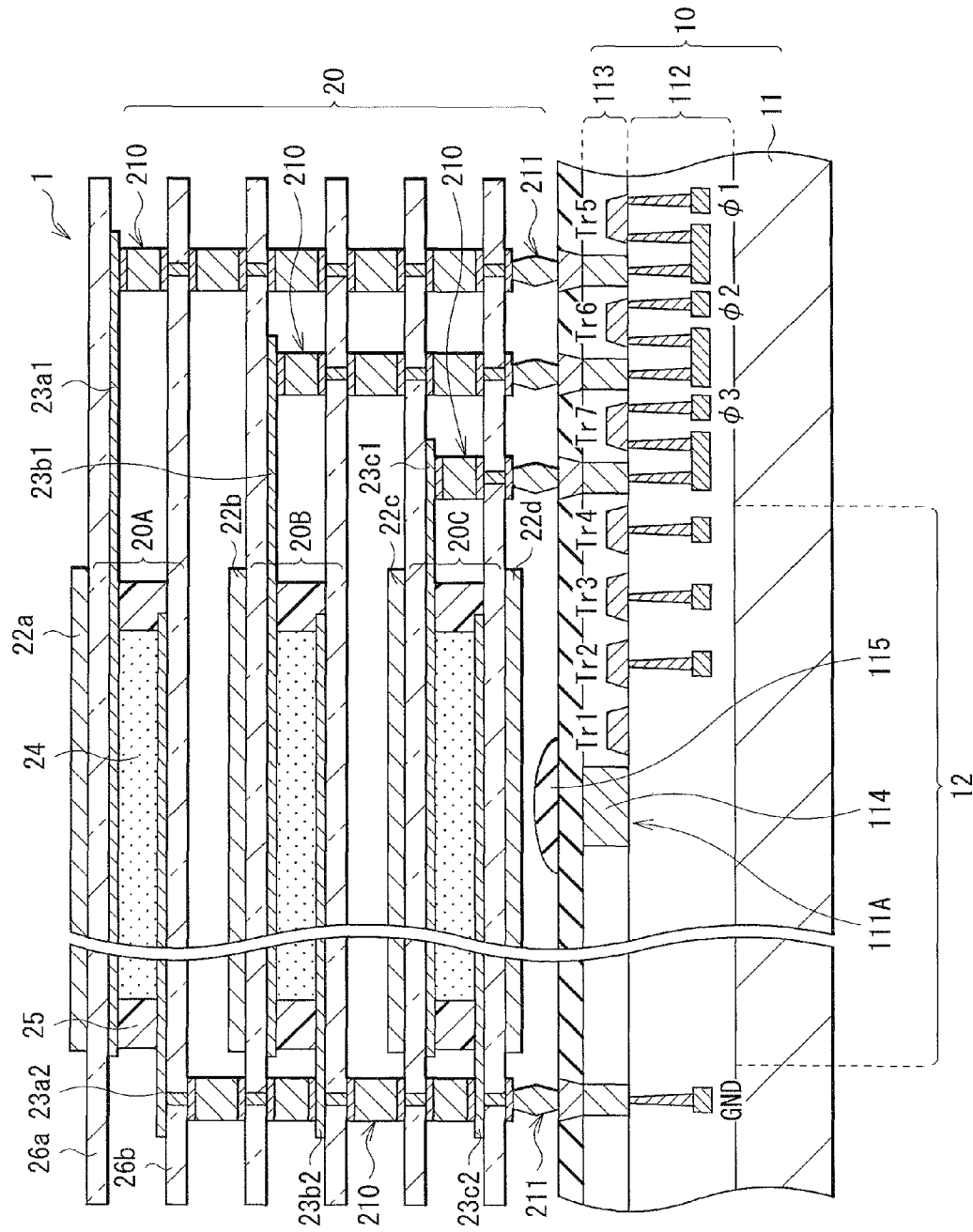
FIG. 5 is a cross-sectional diagram illustrating an outline configuration of the image pickup unit shown in FIG. 1.

FIG. 5 schematically illustrates part of (around boundary of the pixel array section 12 and its peripheral sections) a cross-sectional structure of the image pickup unit 1. The image sensor 10 may be, for example, a CMOS (Complementary Metal Oxide Semiconductor) of a so-called back illumination type that may include a device layer 113 on the substrate 11, and in a layer located in an upper position compared to a wiring layer 112. The device layer 113 includes a photoelectric conversion layer 114. In this structure, for example, the above-described transistors Tr1 to Tr4 for pixel driving and the transistors Tr5 to Tr7 configuring part of the wavelength selection circuit 21 are formed in the device layer 113 together with the photoelectric conversion layer 114. An on-chip lens (OCL) for light condensing is provided directly above the photoelectric conversion layer 114. In the pixel array section 12, for each pixel P, the photodiode 111A that includes the photoelectric conversion layer 114 and the on-chip lens 115, and the above-described four transistors Tr1 to Tr4 are provided. The variable filter 20 is laminated on a light receiving face side of this image sensor 10.

The variable filter 20 may be configured, for example, of a so-called liquid crystal Lyot filter. The liquid crystal Lyot filter is allowed to achieve maximum transmittance of almost 100% and a full width at half maximum (FWHM) of about 100 nm by a combination of liquid crystal cells and polarizing plates as will be described later. Therefore, the liquid crystal Lyot filter has a sufficient performance as a color filter. It is to be noted that, in this liquid crystal Lyot filter, a plurality of liquid crystal cells are driven with a voltage to set the transmission wavelength as will be described later. Therefore, response speed of the liquid crystal easily influences image quality. Therefore, a liquid crystal cell that has response speed of about 5 ms or smaller may be preferably used as the liquid crystal cell. When the response speed is 5 ms or smaller, it is possible to sufficiently follow 60 frame/second of actual moving image shooting. Therefore, it is possible to suppress degradation in image quality resulting from delay in response. Such a liquid crystal Lyot filter may be, for example, a filter in which a plurality of liquid crystal cells that are allowed to be electrically driven in a separated manner and a plurality of polarizing plates are laminated alternately. In the variable filter 20, the transmission wavelength of the variable filter 20 as a whole varies in accordance with a combination of drive voltages that are applied to such a plurality of liquid crystal cells.

Such a variable filter 20 is connected to the electronic circuit (the wavelength selection circuit 21) formed in the image sensor 10 via an anisotropic conductive film 210 and a connection bump 211. It is to be noted that the anisotropic conductive film 210 and the connection bump 211 correspond to specific examples of the wiring 10a in FIG. 1. This variable filter 20 may be configured, for example, of the liquid crystal Lyot filter as described above, and is a filter in which the plurality of (here, three) liquid crystal cells 20A, 20B, and 20C, and polarizing plates 22a, 22b, 22c, and 22d are laminated alternately. In such a variable filter 20, the polarizing plates 22a to 22d may be arranged, for example, so as to allow absorption axes thereof to coincide with one another. However, as with a so-called modification-type Lyot filter, the absorption axis of the polarizing plate 22d on a light emitting side (on an image sensor 10 side) may be arranged to be orthogonal to the absorption axes of other polarizing plates 22a to 22c (may be arranged to form a crossed-Nicols arrangement).

The liquid crystal cells 20A to 20C each transmit a selective wavelength using ECB (Electrically Controlled Birefringence) of liquid crystal. In other words, only specific wavelengths are transmitted by the variable filter 20 as a whole in accordance with a combination of the transmission wavelengths of the respective plurality of liquid crystal cells 20A to 20C. The transmission wavelength of the variable filter 20 is allowed to have various bands depending on the number of stages (the number of laminated layers) of the liquid crystal cells to be configured, a combination of drive voltages applied thereto, etc. Also, it is possible to allow a transmission spectrum of the transmission wavelength to be sharp (to narrow the band of the transmission wavelength), or in reverse, to allow the transmission spectrum to be gentle (to widen the band of the transmission wavelength) depending thereon.

In each of these liquid crystal cells 20A to 20C, a liquid crystal layer 24 is sealed between a pair of transparent substrates 26a and 26b. The liquid crystal cell 20A includes electrodes 23a1 and 23a2 configured of transparent conductive films of ITO (indium-tin oxide) or the like on a liquid crystal layer 24 side of the transparent substrates 26a and 26b. A predetermined voltage is applied to the liquid crystal layer 24 through these electrodes 23a1 and 23a2. One electrode 23a1 of the electrodes 23a1 and 23a2 is connected to the transistor Tr5 via the anisotropic conductive film 210 and the connection bump 211. The other electrode 23a2 may be connected, for example, to the ground. Accordingly, the predetermined drive voltage φ1 is applied to the liquid crystal cell 20A via the transistor Tr5. Similarly, also in the liquid crystal cell 20B, electrodes 23b1 and 23b2 for applying a voltage to the liquid crystal layer 24 are provided on faces on the liquid crystal layer 24 side of the transparent substrates 26a and 26b. One electrode 23b1 thereof is connected to the transistor Tr6 via the anisotropic conductive film 210 and the connection bump 211, and the other electrode 23b2 may be connected, for example, to the ground. Accordingly, the predetermined drive voltage ϕ2 is applied to the liquid crystal cell 20B. Similarly, also in the liquid crystal cell 20C, electrodes 23c1 and 23c2 for applying a voltage to the liquid crystal layer 24 are provided on faces on the liquid crystal layer 24 side of the transparent substrates 26a and 26b. One electrode 23c1 thereof is connected to the transistor Tr7 via the anisotropic conductive film 210 and the connection bump 211, and the other electrode 23c2 may be connected, for example, to the ground. Accordingly, the predetermined drive voltage ϕ3 is applied to the liquid crystal cell 20C.

It is to be noted that, in the liquid crystal cells 20A to 20C, each of the substrates 26a and 26b extends to a peripheral region of the pixel array section 12. Through-hole vias of the number (here, three) of the liquid crystal cells 20A to 20C are formed to run through in a thickness direction in the peripheral region. In the present embodiment, these through-hole vias, the anisotropic conductive film 210, and the connection bump 211 are used to secure electric connection between each of the one electrodes 23a1, 23b1, and 23c1 of the liquid crystal cells 20A to 20C and each of the corresponding transistors Try to Tr7. Further, the other electrodes 23a2, 23b2, and 23c2 of the liquid crystal cells 20A to 20C are each held at a common ground electric potential. Therefore, the other electrodes 23a2, 23b2, and 23c2 are connected to a GND line arranged in the image sensor 10 with the use of the through-hole via common to the respective liquid crystal cells, the anisotropic conductive film 210, and the connection bump 211. However, a technique to electrically connect the respective liquid crystal cells 20A to 20C to the electronic circuit arranged in the image sensor 10 is not limited to that described above, and various techniques such as a technique using another thorough-hole via and bonding may be used.

Due to the above-described configuration, in the variable filter 20, the transmission wavelength is allowed to be set (switched) based on the combination of the drive voltages ϕ1 to ϕ3 to be applied to the respective liquid crystal cells 20A to 20C. In the image pickup unit 1 of the present embodiment, the transmission wavelength of this variable filter 20 is time-divisionally (or, time-divisionally and space-divisionally) switched between the respective wavelengths of R, G, and B, and light is received in the image sensor 10.

Figure 6:
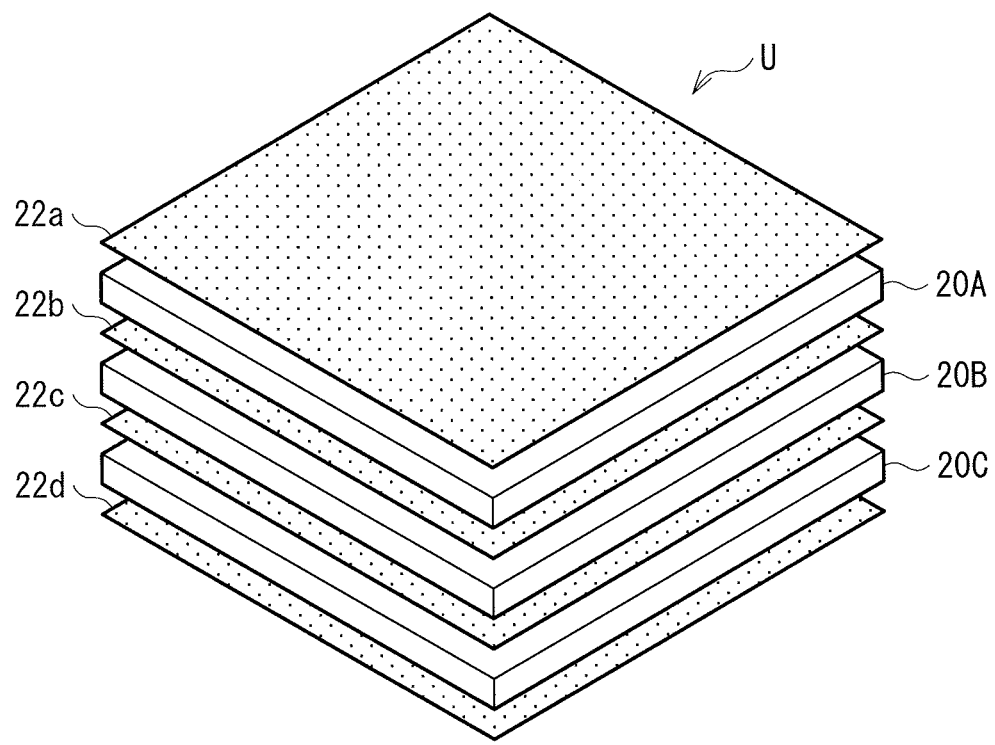
FIG. 6 is a schematic diagram of a cell unit that configures a variable filter.

This variable filter 20 has the structure in which the plurality of liquid crystal cells that are allowed to be electrically controlled in a separated manner are laminated as described above. However, in such a laminated cell structure, the variable filter 20 may be configured to allow one transmission wavelength to be set in common to all pixels, or the variable filter 20 may include a plurality of sub-filters in order to set the transmission wavelengths separately for the respective pixels. Specifically, the variable filter 20 is configured to include one or a plurality of cell units (sub-filters) U each of which is configured of the liquid crystal cells 20A to 20C and the polarizing plates 22a to 22d as shown in FIG. 6. In other words, the variable filter 20 is configured of one cell unit U, or has a plurality of cell units U to which voltages are allowed to be applied separately. When the variable filter 20 has the plurality of cell units U, it is enough that at least the electrodes 23a1, 23b1, and 23c1 are divided into a plurality of pieces (for each pixel row (column) or for each pixel as shown below as examples). Other electrodes 23a2, 23b2, and 23c2, the substrates 26a and 26b, the liquid crystal layer 24, and the polarizing plates 22a to 22d may be provided to be common to all of the pixels P, or may be divided. In this case, a region, in the lamination structure of the variable filter 20, corresponding to each of the divided electrodes corresponds to the above-described cell unit U.

Figure 7:
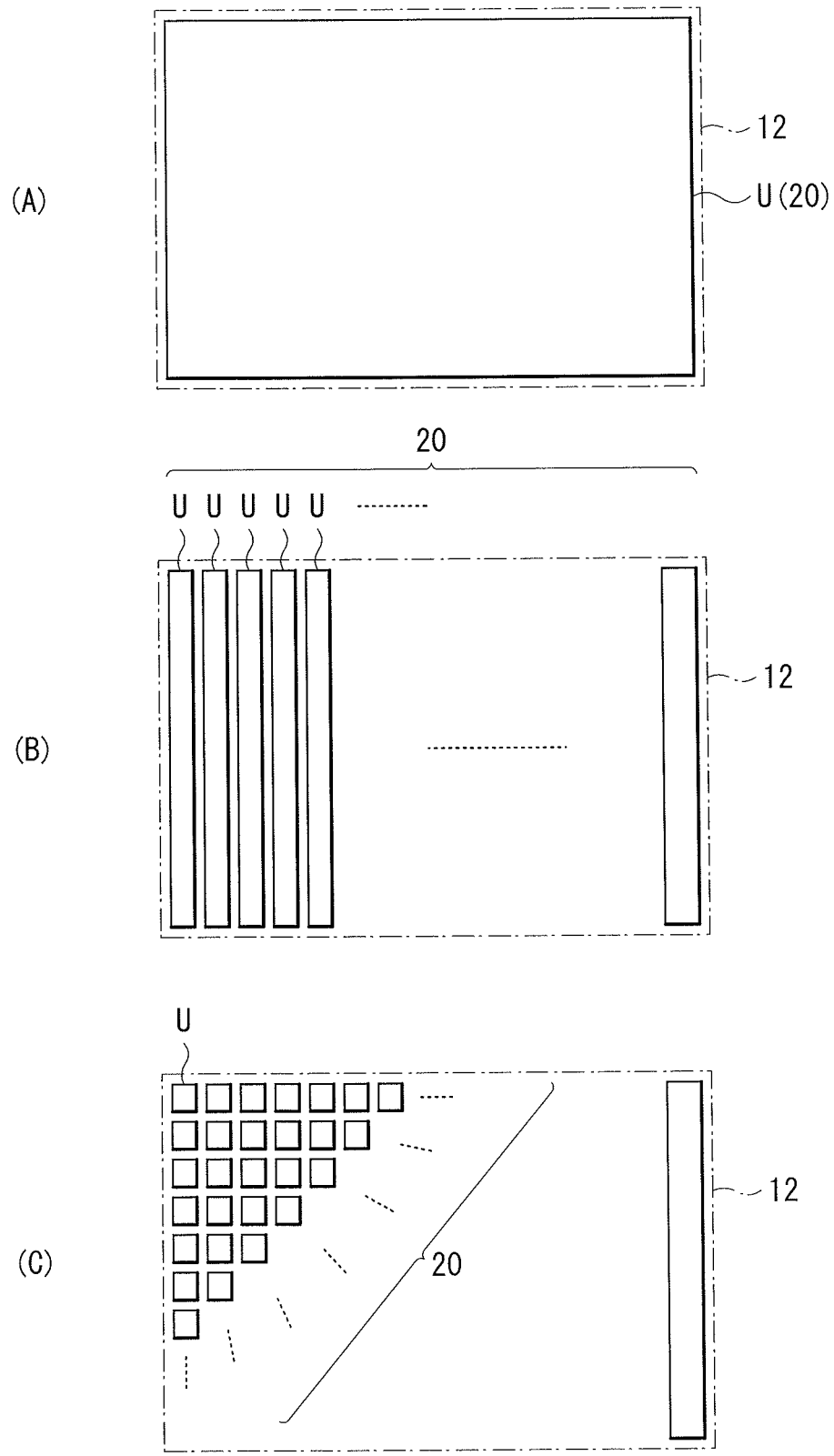
FIG. 7 (A) to (C) are schematic diagrams that each illustrate an example of a layout of the cell unit.

For example, as shown in (A) of FIG. 7, one cell unit U (in this case, the same as the variable filter 20) may be provided over the entire face (all of the pixels P) of the pixel array section 12. In this case, the transmission wavelength is allowed to be switched collectively for the face for each image pickup frame (in a time-divisional manner). Thus, a full-color image is allowed to be generated with a relatively-simple arithmetic processing. However, in a case of this face-collective control, a transfer rate may be desirably high-speed. In this case, for example, a technology of achieving high transfer rate of 34.8 Gbps (ISSCC2011: 23.11 "a17.7 Mpixel 120 fps CMOS Image Sensor with 34.8 Gb/s Readout", T. Toyama et al., Sony Corp. and Sony LSI Corp.), etc. are allowed to be used.

Alternatively, as shown in (B) of FIG. 7, the cell units U that each face a pixel column (or a pixel row) in the pixel array section 12 may be provided. In this case, it is possible to time-divisionally switch the transmission wavelength, and to switch the transmission wavelength for each pixel column also in one frame (in a space-divisional manner). A high transfer rate is not necessary in such control compared to the above-described case of the surface-collective control, and a color image is allowed to be generated easily by an arithmetic operation between adjacent pixels.

Moreover, as shown in (C) of FIG. 7, the cell units U that each face a pixel P in the pixel array section 12 may be provided. In this case, it is possible to time-divisionally switch the transmission wavelength, and to switch the transmission wavelength for each pixel P also in one frame (in a space-divisional manner). Accordingly, as with the above-described example shown in (B) of FIG. 7, there are advantages that the transfer rate is allowed to be relatively low and that a color image is easily generated. Further, this also allows use for shooting only of a selective region with a specific wavelength. Accordingly, it is possible to improve contrast by acquiring information only on a specific object, or by removing a specific component such as a reflection component.

[Functions and Effects]

Figure 8:
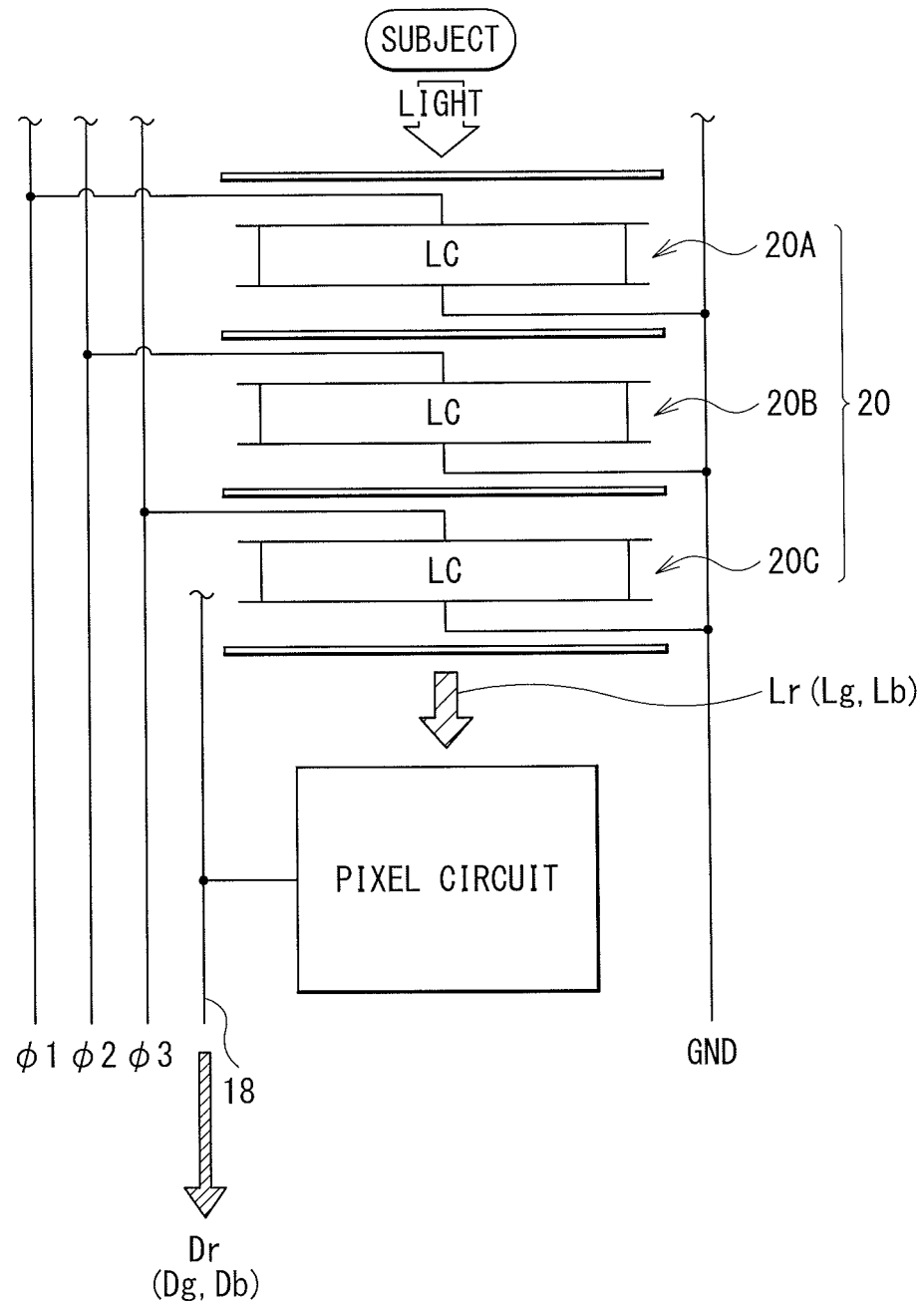
FIG. 8 is a conceptual diagram for explaining a function of the image pickup unit shown in FIG. 1.

Functions and effects of the present embodiment will be described with reference to FIG. 2 to FIG. 11. FIG. 8 is a conceptual diagram for explaining an operation of acquiring image pickup data by the variable filter 20 and the image sensor 10 in the present embodiment.

In the image pickup unit 1, the system control section 16 drives the row scanning section 13, the horizontal selection section 14, and the column scanning section 15 in the image sensor 10, and thereby, exposure is performed in each pixel P (the photodiode 111A), and by photoelectric conversion, an electric signal of an electric charge amount in accordance with the amount of the received light is obtained in the pixel array section 12. The obtained electric signal is line-sequentially read out to the vertical signal line 18, and then, is outputted to the image processing section 22 as image pickup data via the horizontal signal line 19. The image processing section 22 performs a predetermined image arithmetic processing based on the inputted image pickup data, and outputs image data Dout corresponding to a color image.

In the present embodiment, at the time of the above-described image pickup operation in the image sensor 10, the system control section 16 drives the wavelength selection circuit 21, and the transmission wavelength of the variable filter 20 is set. Accordingly, only a specific wavelength out of wavelengths that have entered the variable filter 20 from the subject side passes through the variable filter 20, and enters the pixel array section 12 in the image sensor 10.

[Setting of Transmission Wavelength of Variable Filter 20]

Here, setting of the transmission wavelength of the variable filter 20 is performed as follows. Specifically, as shown in FIG. 8, the system control section 16 applies, with the use of the wavelength selection circuit 21, different voltages to the respective liquid crystal cells 20A to 20C that configure the variable filter 20. For example, the system control section 16 may apply the drive voltage φ1 to the liquid crystal cell 20A, may apply the drive voltage φ2 to the liquid crystal cell 20B, and may apply the drive voltage φ3 to the liquid crystal cell 20C. Depending on the combination of the drive voltages φ1 to φ3 (the combination of the transmission wavelengths of the respective liquid crystal cells 20A to 20C) at this time, only a specific wavelength is transmitted by the variable filter 20 as a whole, and is emitted to the image sensor 10 side. In other words, an image of the subject is acquired as image pickup data for the specific wavelength selected with the use of the variable filter 20. Specifically, as shown in FIG. 8, depending on the combination of the drive voltages φ1 to φ3, the variable filter 20 selectively transmits red light Lr, and thereby, one-color data of R (pixel data Dr) is obtained in each pixel P. Alternatively, one-color data of G (pixel data Dg) is obtained by selectively transmitting green light Lg. Alternatively, one-color data of B (pixel data Db) is obtained by selectively transmitting blue light Lb.

Figure 9:
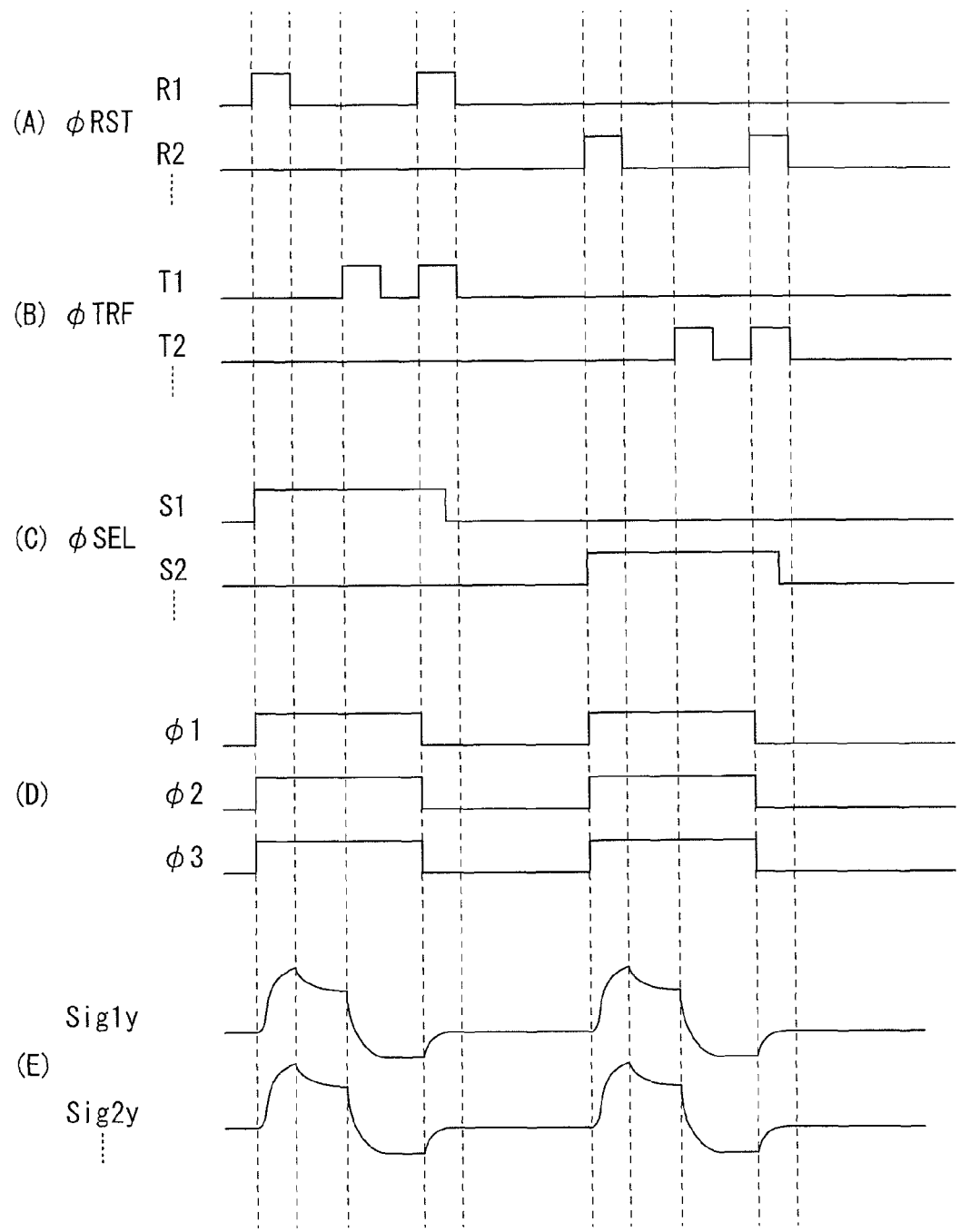
FIG. 9 is a timing diagram for driving the pixel circuit and the wavelength selection circuit.

(A) to (E) of FIG. 9 illustrate an example of a timing of drive, by the system control section 16, of the pixel circuit and the wavelength selection circuit. In these, (A) of FIG. 9 illustrates the reset pulse φRST of the transistor Tr2 (the reset transistor). R1, R2, . . . , illustrate pulse waveforms in the respective reset control lines 172 provided for the respective pixel rows (or pixel columns). (B) of FIG. 9 illustrates the transfer pulse φTRF of the transistor Tr1 (the transfer transistor). T1, T2, . . . , illustrate pulse waveforms in the respective transfer lines 173 provided for the respective pixel rows. (C) of FIG. 9 illustrates the selection pulse φSEL of the transistor Tr4 (the selection transistor). S1, S2, . . . , illustrate pulse waveforms in the respective row selection lines 171 provided for the respective pixel rows. On the other hand, (D) of FIG. 9 illustrates the drive voltages φ1 to φ3 for the respective liquid crystal cells 20A to 20C in the variable filter 20.

As described above, the system control section 16 drives the row scanning section 13, the horizontal selection section 14, and the column scanning section 15 in the image sensor 10 and the wavelength selection circuit 21 in synchronization with one another. Accordingly, as shown in (E) of FIG. 9, signal electric charges sig1y, sig2y, . . . are acquired for the respective vertical signal lines 18 as one-color data corresponding to the combination of the drive voltages φ1 to φ3.

[Time-Divisional Switching Operation of Transmission Wavelength (R, G, and B)]

However, in the present embodiment, light is received in the image sensor 10 while the transmission wavelength of the variable filter 20 is switched time-divisionally, and thereby, image pickup data is acquired. Specifically, as schematically shown in (A) to (C) of FIG. 10, the variable filter 20 is driven to allow the respective color light of R, G, and B are transmitted in a time-divisional switching manner, and one-color data (pixel data) of R, G, and B are acquired in a temporally-successive manner in each pixel P in the image sensor 10.

At this time, the switching of the transmission wavelength of the variable filter 20 is performed separately for the above-described respective one or the plurality of cell units U shown in (A) to (C) of FIG. 7. For example, as in the example in (A) of FIG. 7, when one cell unit U is provided over the entire face (all of the pixels P) in the pixel array section 12, the transmission wavelength is time-divisionally switched collectively for all of the pixels (collectively for the face). Specifically, as shown in (A) of FIG. 10, R light is selectively transmitted to acquire one-color pixel data of R at a timing t1, G light is selectively transmitted to acquire one-color pixel data of G at a timing t2 subsequent to the timing t1, and B light is selectively transmitted to acquire one-color pixel data of B at a timing t3 subsequent to the timing t2.

Alternatively, as in the example in (B) of FIG. 7, when the variable filter 20 includes the cell units U (U1, U2, U3, . . . ) that each face a pixel column (or a pixel row) in the pixel array section 12, in addition to the above-described time-divisional control, the transmission wavelengths may be repeatedly controlled in a space-divisional manner to be different between the respective cell units U1, U2, U3, . . . . Specifically, as shown in (B) of FIG. 10, at a timing t1, the R light, the G light, and the B light are transmitted in the cell unit U1, the cell unit U2, and the cell unit U3, respectively. Further, at a timing t2 subsequent to this timing t1, switching is performed to allow the G light, the B light, and the R light to be transmitted in the cell unit U1, the cell unit U2, and the cell unit U3, respectively. Further, at a timing t3 subsequent to the timing t2, switching is performed to allow the B light, the R light, and the G light to be transmitted by the cell unit U1, the cell unit U2, and the cell unit U3, respectively.

Alternatively, as in the example in (C) of FIG. 7, when the variable filter 20 includes the cell units U (U1, U2, U3, U4, . . . ) that each face a pixel P in the pixel array section 12, in addition to the above-described time-divisional control, the transmission wavelengths may be repeatedly controlled in a space-divisional manner to be different between the respective cell units U1, U2, U3, U4, . . . . Specifically, as shown in (C) of FIG. 10, at a timing t1, the R light, the G light, the G light, and the B light are transmitted in the cell unit U1, the cell unit U2, the cell unit U3, and the cell unit U4, respectively. Further, at a timing t2 subsequent to this timing t1, switching is performed to allow the G light, the B light, the B light, and the R light to be transmitted in the cell unit U1, the cell unit U2, the cell unit U3, and the cell unit U4, respectively. Further, at a timing t3 subsequent to the timing t2, switching is performed to allow the B light, the R light, the R light, and the G light to be transmitted in the cell unit U1, the cell unit U2, the cell unit U3, and the cell unit U4, respectively.

Figure 10:
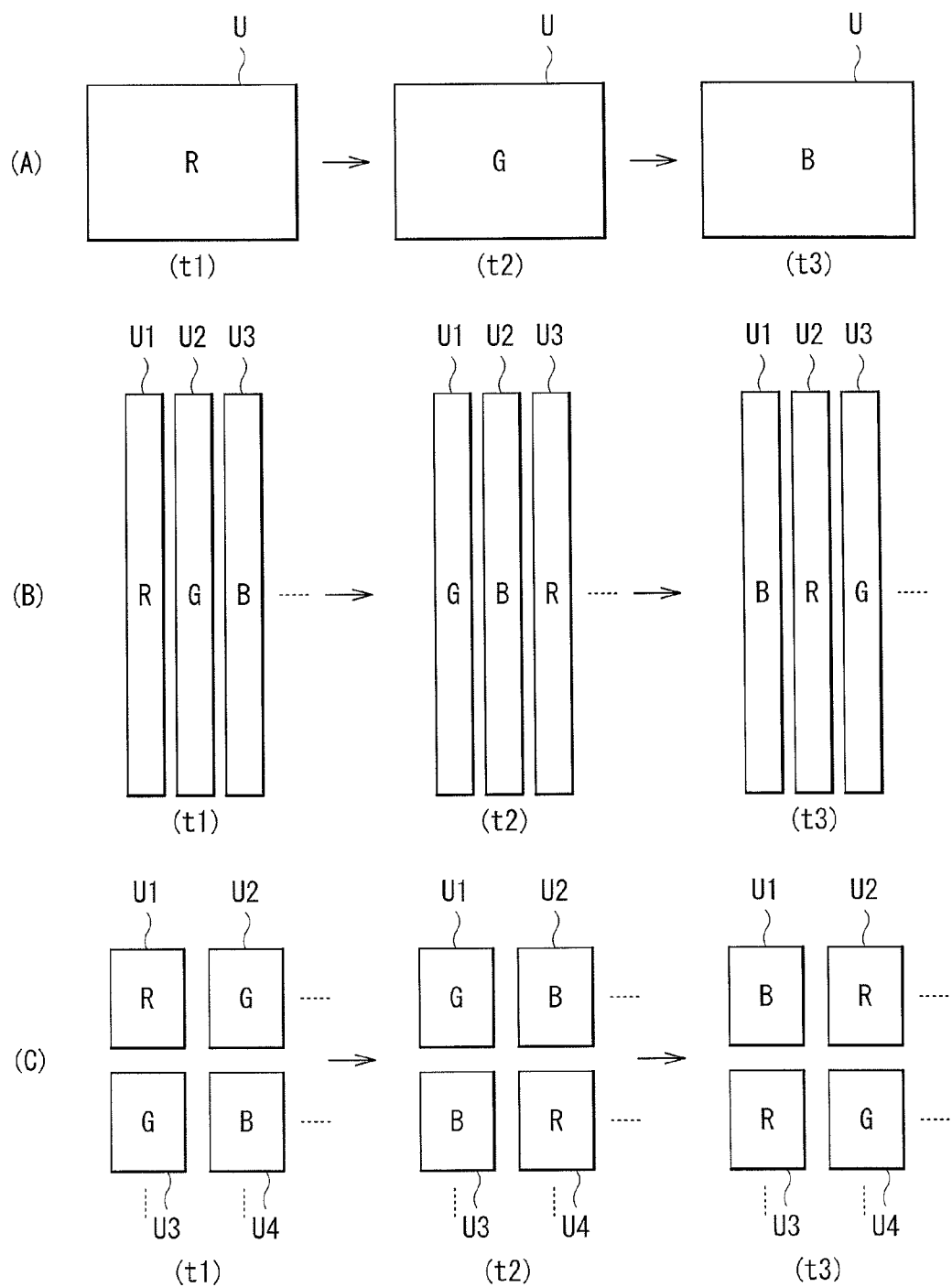
FIG. 10 (A) to (C) are schematic diagrams each illustrating an example of time-divisional drive of the variable filter.

It is to be noted that, as in the above-described (B) and (C) of FIG. 10, when the transmission wavelength is controlled to be switched also space-divisionally, the combination of the drive voltages φ1 to φ3 may be varied for each cell unit U, and the respective cell units U may be driven separately with the use of a voltage.

By the above-described time-divisional switching control of the transmission wavelength of the variable filter 20, in the image sensor 10, the respective one-color data (pixel data Dr, Dg, and Db) of R, G, and B is successively acquired in time series in each pixel P. Image pickup data D0 that includes the time-series data of R, G, and B acquired in such a manner is outputted to the image processing section 22 as described above.

[Image Processing Operation]

Figure 11:
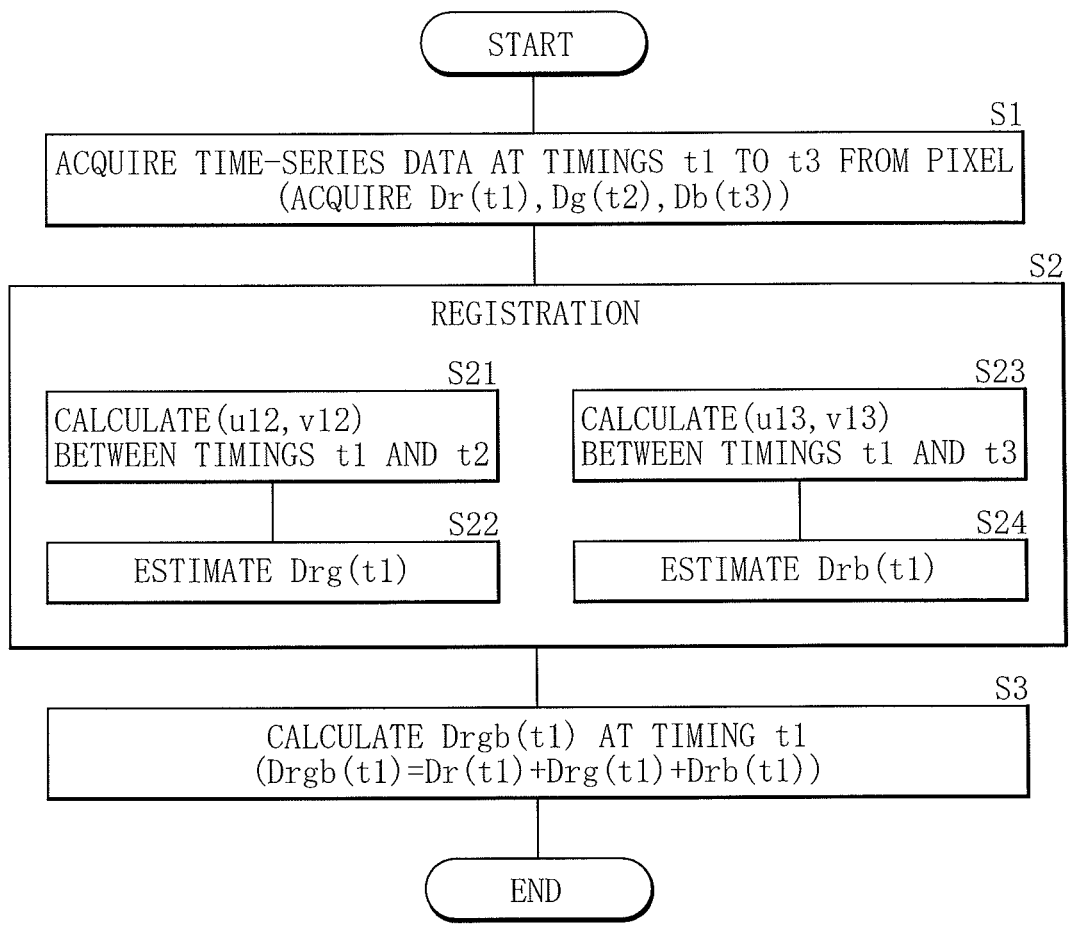
FIG. 11 is a flow chart illustrating an image processing operation.

FIG. 11 is a flow chart illustrating an example of an image arithmetic processing operation in the image processing section 22. The image pickup data D0 includes pixel data of the respective colors of R, G, and B that are acquired in a temporally-successive manner as described above. The image processing section 22 generates a color image of three primary colors by an arithmetic processing using such image pickup data D0.

Specifically, first, the image processing section 22 acquires one-color pixel data Dr(t1), Dg(t2), and Db(t3) of R, G, and B obtained at successive timings t1 to t3 (corresponding to the above-described timings t1 to t3 in (A) of FIG. 7) as the image pickup data D0 based on the control by the system control section 16 (step S1).

Subsequently, the image processing section 22 uses the acquired pixel data Dr(t1), Dg(t2), and Db(t3) to estimate a fine displacement in position of the subject between temporally-successive image pickup frames at an accuracy of sub-pixel (registration), and generates pixel data of three colors of R, G, and B at the timing t1 (step S2). This is a processing to fill (interpolate) a gap between pixels with the use of the pixel data between temporally-successive frames, assuming that an interval Δt between the respective timings t1 to t3 is sufficiently short. In particular, in the case of shooting a moving image, each timing interval is sufficiently short as, for example, about several tens ms. Therefore, it is allowed to be assumed that a variation in the amount of received light is resulting only from parallel movement of the subject. As a registration technique, for example, an optical flow method as described below, etc. may be used.

In the optical flow method, a movement amount of the subject in a fine period is determined, and an image is generated by interpolation based on this movement amount. Here, in x- and y-directions that are orthogonal to each other in a two-dimensional plane, when a movement amount in the x-direction is expressed as u, and a movement amount in the y-direction is expressed as v, the respective movement amounts u and v are allowed to be determined by minimizing an error function E (u, v) shown in the following Expression (1). It is to be noted that, in Expression (1), $I_1$ represents an image observed at a timing t, and $I_2$ represents an image observed at a timing at which Δt has elapsed from the timing t. When both of the movement amounts u and v are extremely small, $I_2$ is allowed to be approximated as the following Expression (2) by Taylor series expansion. Accordingly, the error function E (u, v) is expressed as the following Expression (3). Further, this Expression (3) is partially differentiated for each of u and v, and u and v that allow the partial differentiation to be 0 are determined, which are expressed as the following Expression (4). It is to be noted that, in Expression (4), A and b are expressed by Expression (5) and Expression (6), respectively.

$$E(u, v) = \sum_{x,y} (I_2(x+u, y+v) - I_1(x, y))^2 \quad (1)$$

$$I_2(x+u, y+v) \approx I_2(x, y) + u\frac{\partial I_2(x, y)}{\partial x} + v\frac{\partial I_2(x, y)}{\partial y} \quad (2)$$

$$E(u, v) = \sum_{x,y} \left(I_2(x, y) + u\frac{\partial I_2(x, y)}{\partial x} + v\frac{\partial I_2(x, y)}{\partial y} - I_1(x, y)\right)^2 \quad (3)$$

$$\begin{pmatrix} u \\ v \end{pmatrix} = A^{-1} b \quad (4)$$

$$A = \sum_{x,y} \nabla I_2(x, y) \cdot \nabla I_2(x, y)^T \quad (5)$$

$$b = -\sum_{x,y} \nabla I_2(x, y)(I_2(x, y) - I_1(x, y)) \quad (6)$$

At the time of the registration in step S2, the image processing section 22 first uses the above-described optical flow method to calculate a movement amount (u12, v12) between the timing t1 at which the R pixel data Dr(t1) is acquired and the timing t2 at which the G pixel data Dg(t2) is acquired (step S21). Taking into consideration the movement amount (u12, v12) calculated in such a manner, G pixel data Drg(t1) at the timing t1 is estimated (step S22). Also, on the other hand, the image processing section 22 uses the above-described optical flow method to calculate a movement amount (u13, v13) between the timing t1 at which the R pixel data Dr(t1) is acquired and the timing t3 at which the B pixel data Db(t3) is acquired (step S23). Taking into consideration the movement amount (u13, v13) calculated in such a manner, B pixel data Drb(t1) at the timing t1 is estimated (step S24).

Subsequently, the image processing section 22 adds the G pixel data Drg(t1) and the B pixel data Drb(t1) at the timing t1 determined by the above-described estimation arithmetic processing to the R pixel data Dr(t1) acquired at the timing t1. The image processing section 22 thereby generates color (thee-primary-color) pixel data (data for one pixel) Drgb(t1) at the timing t1. Further, the image processing section 22 performs such an arithmetic processing on all of the pixels P, and sums them up. Thus, a color image Irgb(t1) that has been shot at the timing t1, and has a resolution corresponding to the number N of the pixels in the pixel array section 12 is generated. Alternatively, the color image Irgb(t1) may be generated by the following procedure. Specifically, the pixel data Dr(t1), Drg(t1), and Drb(t1) at the timing t1 are determined by the above-described registration for all of the pixels P, and the determined data are synthesized for each color. Thus, an R image Ir(t1), a G image Ig(t1), and a B image Ib(t1) are generated. Further, these images Ir(t1), Ig(t1), and Ib(t1) of the respective colors may be summed up to generate the color image Irgb(t1).

Further, pixel data are acquired in a temporally-successive manner repeatedly in order of R→G→B also for a timing t4 and the subsequent timings, and similar arithmetic processings are performed using the respective timings t2, t3, . . . , as references. Thus, color images Irgb(t2), Irgb(t3), . . . are allowed to be generated also at the timing t2 and the subsequent timings. For example, color pixel data Drgb(t2) at the timing t2 may be determined as follows. Specifically, a movement amount (u23, v23) between the timing t2 at which the G pixel data Dg(t2) is acquired and the timing t3 at which the B pixel data Db(t3) is acquired is calculated. Taking into consideration this movement amount (u23, v23), B pixel data Dgb(t2) at the timing t2 is estimated. On the other hand, a movement amount (u24, v24) between the timing t2 at which the G pixel data Dg(t2) is acquired and the timing t4 at which the R pixel data Dr(t4) is acquired is calculated. Taking into consideration this movement amount (u24, v24), R pixel data Dgr(t2) at the timing t2 is estimated. Thus, the B pixel data Dgb(t2) and the R pixel data Dgr(t2) at the timing t2 are generated.

It is to be noted that, in the above-described arithmetic processing, registration and RGB addition are performed for each pixel data obtained from the pixel P, and the resulted data are synthesized at last to generate a color image. However, the registration is not performed limitedly on a pixel unit basis, and the above-described registration may be performed on a block region unit basis, on a pixel column unit basis, a pixel row unit basis, or on an all-pixel (face, frame) unit basis to generate a color image data. The block region is configured of two or more pixels. In other words, as long as color images for the respective timings are generated with the use of the time-series data of R, G, and B, it is possible to obtain an effect (of suppressing occurrence of false color, color mixture, etc.) which will be described later.

Further, in a case of shooting a still image in particular, a color image may be also generated as follows when the movement amount of the subject is extremely small (for example, an image is not shifted for a period of about 50 ms). Specifically, in a case where it is assumed that the time interval of the timings t1 to t3 is sufficiently short, in a pixel P, an incident light spectrum A ($\lambda$) of the timing t ($=\Sigma t_i/3$ (i=1, 2, 3)) of the pixel P is expressed as the following Expression (7), where output of R at the timing t1 is $\zeta 1$, output of G at the timing t2 is $\zeta 2$, output of B at the timing t3 is $\zeta 3$, spectra of R, G, B that are perceivable by a human eye are R($\lambda$), G($\lambda$), and B($\lambda$), respectively. The color images at the timings t1 to t3 may be generated based on this relationship.

$$A(\lambda)=\zeta_1 R(\lambda)+\zeta_2 G(\lambda)+\zeta_3 B(\lambda) \qquad (7)$$

R($\lambda$): an incident light spectrum of R at the timing t1
G($\lambda$): an incident light spectrum of G at the timing t2
B($\lambda$): an incident light spectrum of B at the timing t3
A($\lambda$): an incident light spectrum at the timing t (=(t1+t2+t3)/3)

In such a manner, in the present embodiment, in both cases of shooting a still image and of shooting a moving image, color images are allowed to be generated successively. It is to be noted that the image processing section 22 may also use, for example, a color interpolation processing such as a demosaic processing other than the above-described arithmetic processing. Also, the image processing section 22 may separately perform, for example, a white balance adjusting processing, a gamma correction processing, etc.

As described above, in the image pickup unit 1 of the present embodiment, it's the transmission wavelength (for example, R, G, and B) of the variable filter 20 is switched time-divisionally in the variable filter 20. Accordingly, as the image pickup data D0, one-color pixel data of R, G, and B corresponding to the transmission wavelengths of the variable filter 20 are allowed to be acquired in a temporally-successive manner.

Here, in a typical image pickup unit that performs color photography, a color filter (a filter in which respective transmission regions for R, G, and B are arranged space-divisionally) that transmits one color of R, G, and B is provided on the light receiving face of the image sensor. In such a configuration, only pixel data of one color of R, G, or B is obtained in each pixel in the image sensor. Therefore, it is necessary to perform a color interpolation processing to generate the pixel data of R, G, and B of the number of the pixels in the image sensor. In such an image pickup unit, in a case where a color image having a large contrast difference is generated in particular, a so-called false color, color mixture, etc. may be easily caused, and therefore, display quality is degraded.

On the other hand, in the present embodiment, as described above, the variable filter 20 is used to acquire the respective pixel data of R, G, and B in a temporally-successive manner, and the predetermined image processing is performed based on these pixel data of R, G, and B to generate the color images at the respective shooting timings. Timings of acquiring images of R, G, and B by time-divisional drive are performed in an extremely-short period. Therefore, the respective images of R, G, and B acquired in a temporally-successive manner are acquired approximately at the same time. Therefore, even when the respective images of R, G, and B are summed up, and an arithmetic processing for averaging is performed, false color, color mixture, etc. are less likely to be caused. Therefore, it is possible to suppress occurrence of false color, color mixture, etc. and to acquire a color image with high image quality.

Hereinafter, modifications (Modifications 1 to 4) of the above-described embodiment will be described. It is to be noted that the same numerals are used to designate components similar to those in the image pickup unit 1 of the above-described embodiment, and the description thereof will be appropriately omitted.

[Modification 1]

In the above-described embodiment, description has been given on the case in which the image processing section 22 performs the arithmetic processing to generate the color image using the time-series data of R, G, and B. However, at the time of generating the color image, data of another wavelength, for example, of a near-infrared ray (IR), etc. may be further used in addition to R, G, and B.

However, in the present modification, it may be desirable to use, for the photodiode 111A arranged in each pixel P in the image sensor 10, a photoelectric conversion material that has favorable sensitivity with respect to near-infrared rays (for example, 0.7 µm to 2.5 µm), middle-infrared rays (for example, 2.5 µm to 4 µm), or far-infrared rays (for example, 4 µm to 20 µm) in addition to the respective wavelengths of R, G, and B. As such a photoelectric conversion material, for example, compound semiconductors can be mentioned such as PbTe, SnTe, PbSe, and SnSe, as well as PbSnTe, PbSnSeTe, and PbEuTe that are mixed crystal thereof. These compound semiconductors have an extremely-narrow band gap (0.3 eV or smaller), and therefore, have favorable absorption rate of far-infrared rays and light having a shorter wavelength (a wavelength of 20 µm or shorter). Therefore, due to wavelength dependency of an absorption coefficient of the material, photoelectric conversion is allowed to be performed on arbitrary wavelength in a range from a ultraviolet range to an infrared range. It is to be noted that the photoelectric conversion material in the present modification is not limited to such a compound semiconductor, and an organic semiconductor that serves as a photoelectric conversion material may be used. It is to be noted that it goes without saying that such compound semiconductors, such organic semiconductors, etc. that have sensitivity covering the infrared range are allowed to be used also in a case where the color image is generated using only the data of R, G, and B as in the above-described embodiment.

On the other hand, a variable filter similar to that in the above-described embodiment may be used as the variable filter 20. For example, a Lyot filter configured by laminating the liquid crystal cells 20A to 20C as in the above-described embodiment may be used. In the present modification, it is possible to drive the variable filter 20 to allow near-infrared rays to be selectively transmitted at a certain timing by appropriately setting the combination of the drive voltages φ1 to φ3 for the respective liquid crystal cells 20A to 20C.

In the present embodiment, while the variable filter 20 is used to transmit four wavelengths of R, G, B, and IR by time-divisional switching, image pickup is performed, in each pixel P in the image sensor 10, using the above-described photodiode 111A that has sensitivity to the infrared range. Accordingly, in each pixel P, respective pixel data Dr, Dg, Db, and Di of R, G, B, and IR are acquired successively in time series. The image pickup data D0 that includes the time-series data of R, G, B, and IR acquired in such a manner is outputted to the image processing section 22.

Figure 12:
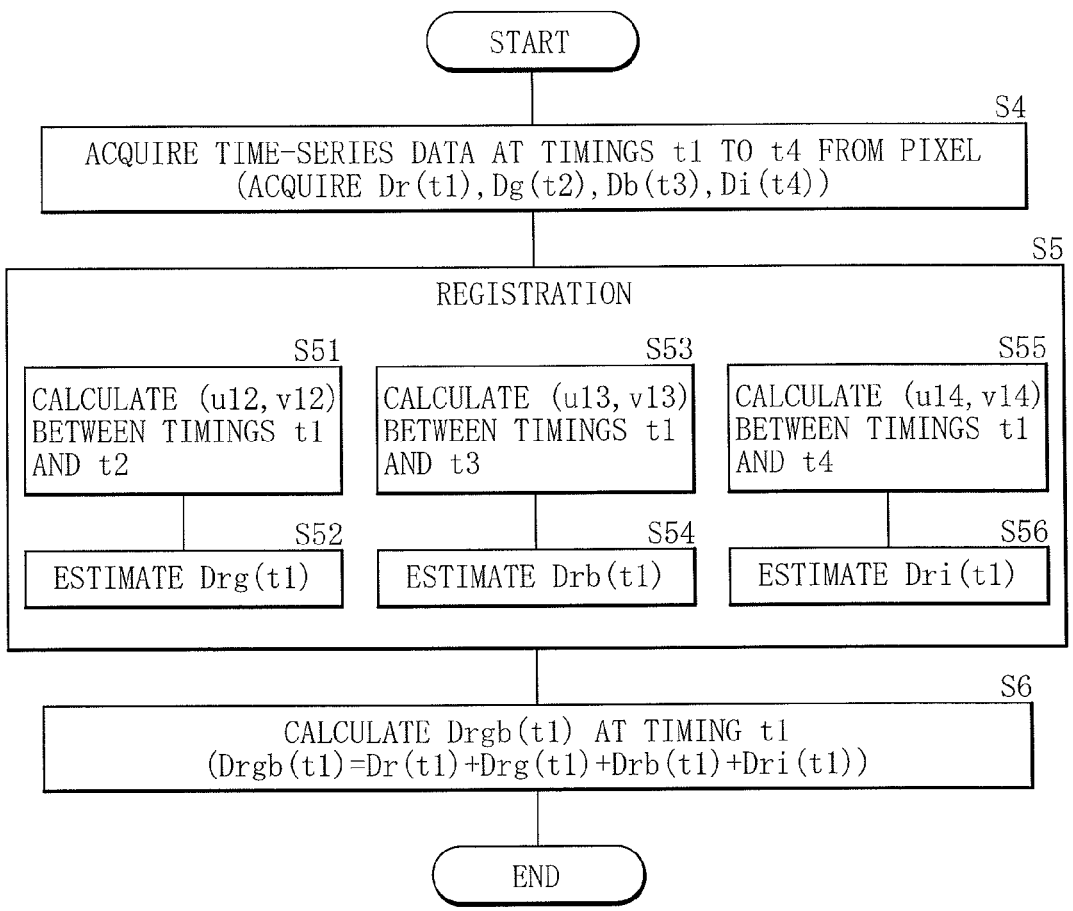
FIG. 12 is a flow chart illustrating an image processing operation according to Modification 1.

FIG. 12 is a flow chart diagram of an image arithmetic processing according to Modification 1. In the present modification, the image processing section 22 generates a color image as follows. Specifically, first, the image processing section 22 acquires, as the image pickup data D0, the respective pixel data Dr(t1), Dg(t2), Db(t3), and Di(t4) of R, G, B, and IR obtained at the successive timings t1 to t4, based on the control by the system control section 16.

Subsequently, the image processing section 22 performs registration, for example, by the above-described optical flow method, with the use of the acquired pixel data Dr(t1), Dg(t2), Db(t3), and Di(t4), to generate pixel data of three colors of R, G, and B at the timing t1 (step S5). Specifically, in a manner similar to that in the above-described embodiment, the movement amount (u12, v12) between the timing t at which the R pixel data Dr(t1) is acquired and the timing t2 at which the G pixel data Dg(t2) is acquired is calculated (step S51). Taking into consideration the movement amount (u12, v12) calculated in such a manner, G pixel data Drg(t1) at the timing t1 is estimated (step S52). Further, the movement amount (u13, v13) between the timing t at which the R pixel data Dr(t1) is acquired and the timing t3 at which the B pixel data Db(t3) is acquired is calculated (step S53). Taking into consideration the movement amount (u13, v13) calculated in such a manner, B pixel data Drb(t1) at the timing t1 is estimated (step S54). Further, in the present modification, a movement amount (u14, v14) between the timing t1 at which the R pixel data Dr(t1) is acquired and the timing t4 at which the IR pixel data Di(t4) is acquired is calculated (step S55). Taking into consideration the movement amount (u14, v14) calculated in such a manner, the IR pixel data Dri(t1) at the timing t1 is estimated (step S56).

Subsequently, the image processing section 22 adds the G pixel data Drg(t1), the B pixel data Drb(t1), and the IR pixel data Dri(t1) at the timing t1 determined by the above-described estimation arithmetic processing to the R pixel data Dr(t1) acquired at the timing t1. The image processing section 22 thereby generates color (thee-primary-color) pixel data (data for one pixel) Drgb(t1) at the timing t1. Such an arithmetic processing is performed on all of the pixels P and the results are summed up to generate the color image Irgb(t1). Further, pixel data are acquired in a temporally-successive manner repeatedly in order of R→G→B→IR also for a timing t5 and subsequent timings, and similar arithmetic processings are performed using the respective timings t2, t3, . . . , as references. Thus, color images Irgb(t2), Irgb(t3), . . . are allowed to be generated also for the timing t2 and the subsequent timings.

As in the present modification, the pixel data based on the near-infrared rays may be acquired in addition to those based on the respective color light of R, G, and B, and these pixel data for the four wavelengths may be used to generate the color images. Also in this case, as in the above-described embodiment, the color image is generated based on the time-series data of R, G, and B. Therefore, it is possible to suppress occurrence of false color, color mixture, etc. Accordingly, it is possible to obtain an effect equivalent to that in the above-described embodiment.

Further, by using the near-infrared rays, it is possible to acquire a bright image, for example, even in a dark place. Further, here, when a typical color filter is used, it is necessary to provide an IR filter by space division. Therefore, it is not allowed to apply an existing color arrangement (such as the Bayer arrangement) as it is. In the present modification, as described above, it is possible to switch the transmission wavelength to the near-infrared ray by electric control of the variable filter 20, and therefore, change in design of wavelength is easy.

[Modification 2]

Figure 13:
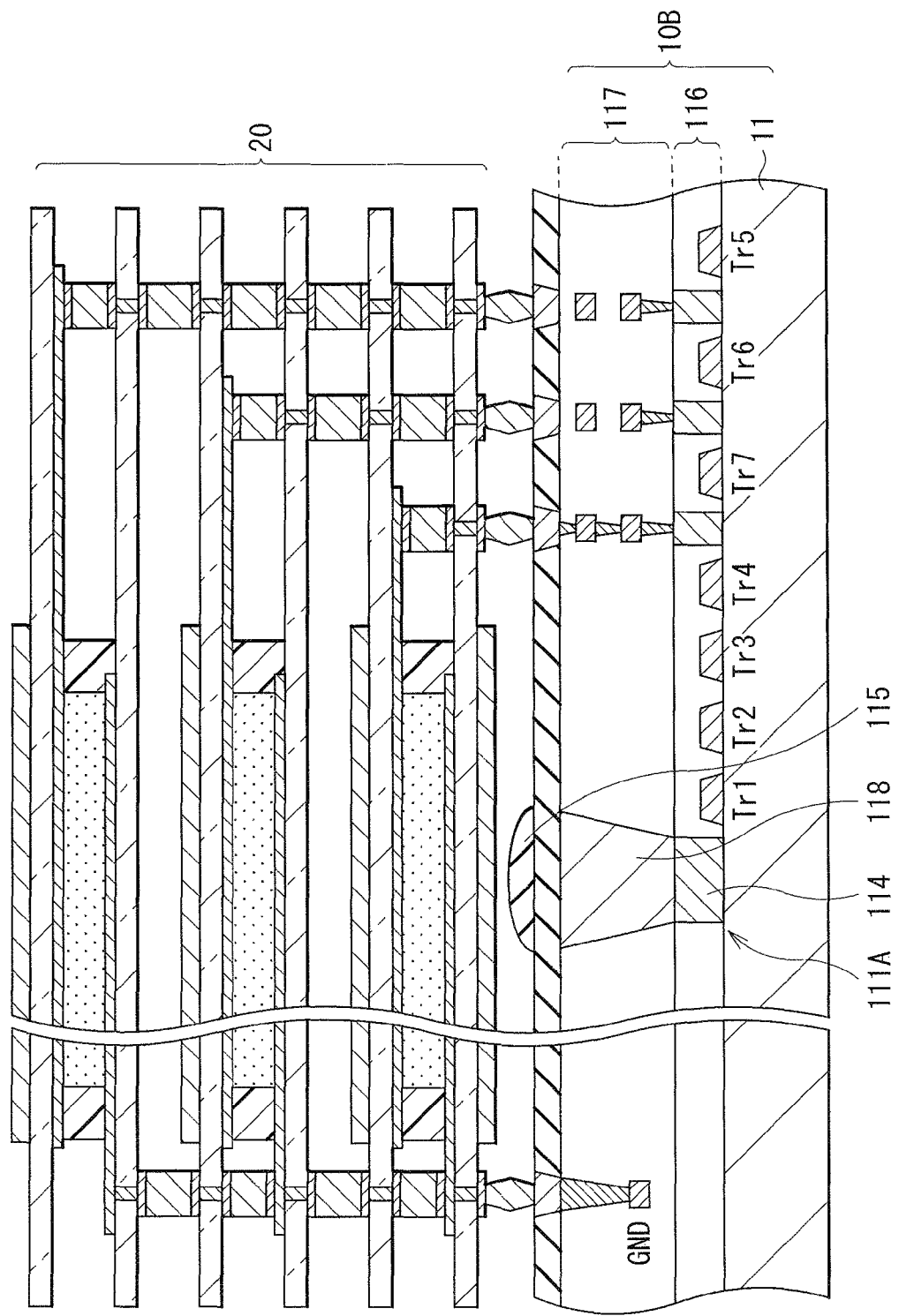
FIG. 13 is a cross-sectional diagram illustrating an outline configuration of an image pickup unit according to Modification 2.

FIG. 13 schematically illustrates part of a cross-sectional structure of an image pickup unit that includes an image sensor (an image sensor 10B) according to Modification 2. Also in the present modification, the variable filter 20 is provided on a light receiving face of the image sensor 10B. However, in the present modification, the image sensor 10B may be, for example, a CMOS of a so-called front illumination type, that includes a device layer 116 including the photoelectric conversion layer 114 on the substrate 11, and in a layer located in a lower position compared to the wiring layer 112. Also in this structure, as in the above-described case of the back illumination type, the above-described transistors Tr1 to Tr4 for pixel driving and the transistors Tr5 to Tr7 configuring part of the wavelength selection circuit 21 are formed in the device layer 116 together with the photoelectric conversion layer 114. However, in the present modification, a waveguide layer 118 is formed in a region corresponding to the wiring layer 117 directly on the photoelectric conversion layer 114. The on-chip lens 115 is provided on this waveguide layer 118. In such a manner, the image sensor 10B is not limited to that of the back illumination type, and that of the front illumination type may be used as the image sensor 10B.

[Modification 3]

Figure 14:
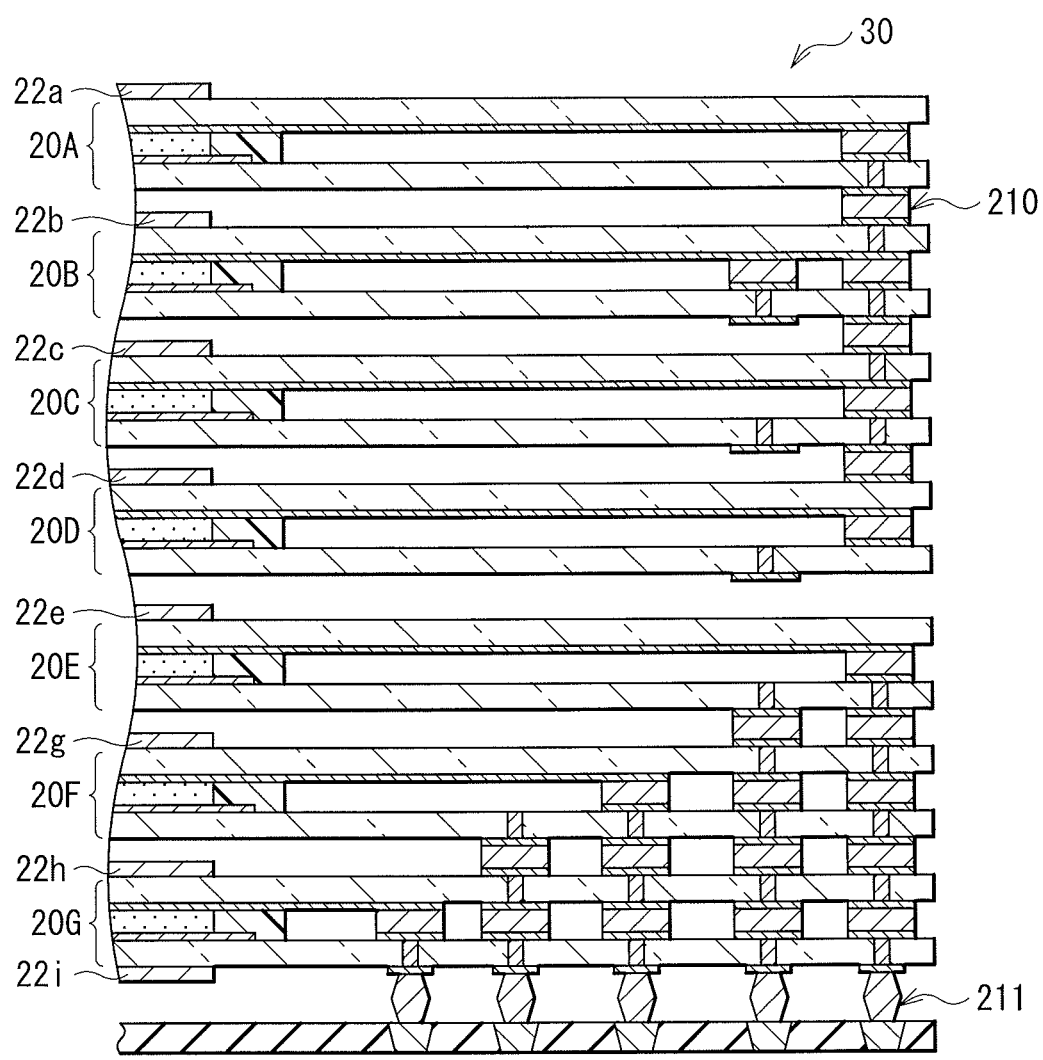
FIG. 14 is a cross-sectional diagram illustrating an outline configuration of a variable filter according to Modification 3.

FIG. 14 illustrates a cross-sectional structure of a variable filter (a variable filter 30) according to Modification 3. As with the variable filter 20 in the above-described embodiment, the variable filter 30 in the present modification is provided on the light receiving face of the image sensor 10, and has the function of time-divisionally switching the transmission wavelength. Further, the variable filter 30 may be configured, for example, of a liquid crystal Lyot filter in which a plurality of liquid crystal cells are laminated. The variable filter 30 may include a plurality of cell units U in a direction along the substrate surface as necessary.

However, in the present modification, the variable filter 30 is configured by alternately laminating seven (seven stages of) liquid crystal cells 20A to 20G, and eight polarizing plates 22a to 22i. Each of these seven liquid crystal cells 20A to 20G has a configuration similar to that of the liquid crystal cells 20A to 20C described in the above embodiment. Each of these seven liquid crystal cells 20A to 20G is electrically connected to a transistor (not illustrated in FIG. 14) arranged in the image sensor 10 via the anisotropic conductive film 210 and the connection bump 211. It is to be noted that FIG. 14 illustrates only part of the through-hole vias for connecting the respective liquid crystal cells 20A to 20G to the transistors, the anisotropic conductive film 210, and the connection bump 211. These vias, the anisotropic conductive film 210, and the connection bump 211 are formed also in other portions which are not illustrated. Accordingly, the liquid crystal cells 20A to 20G are allowed to be electrically controlled in a separated manner.

In such a manner, also in the case in which the number of stages in the variable filter 30 is increased, and for example, seven liquid crystal cells 20A to 20G are laminated, by appropriately setting the combination of the drive voltages φ1 to φ7 for the respective liquid crystal cells 20A to 20G, it is possible to transmit a desirable selective wavelength, and to time-divisionally switch its transmission wavelength, as in the above-described embodiment.

Figure 15:
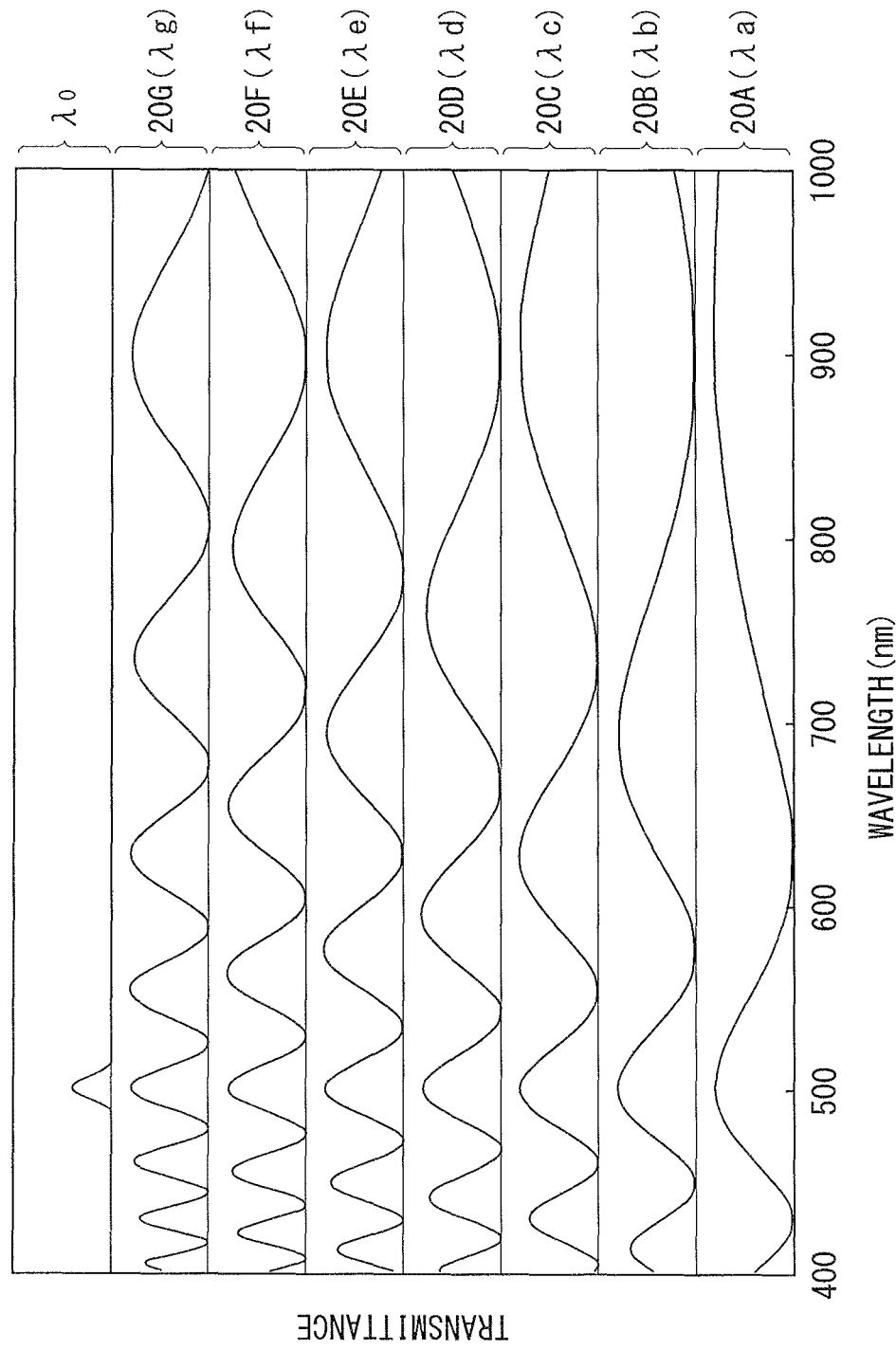
FIG. 15 is an example of a combination of transmission wavelengths in respective liquid crystal cells in the variable filter shown in FIG. 14.

Moreover, as in the present modification, by increasing the number of stages of the liquid crystal cells, it is possible to control the spectrum of the transmission wavelength of the variable filter more precisely. As an example, FIG. 15 illustrates respective transmission wavelengths λa to λg of the liquid crystal cells 20A to 20G, and a transmission wavelength $\lambda_o$ of the variable filter 30 as a whole. In this example, by setting the respective transmission wavelengths λa to λg of the liquid crystal cells 20A to 20G as shown in the drawing, it is possible to set a spectrum peak of the transmission wavelength at about 500 nm. Further, it is possible to narrow FHM to about 20 nm, and thereby, in particular, absorption or reflective spectrum intensity unique to a substance is allowed to be easily acquired. In other words, concentration, position, etc. of a specific substance is allowed to be detected. Therefore, an image pickup unit suitable for an electronic apparatus in which a measurement function, a detection function, etc. of a specific substance are necessary.

[Modification 4]

Figure 16:
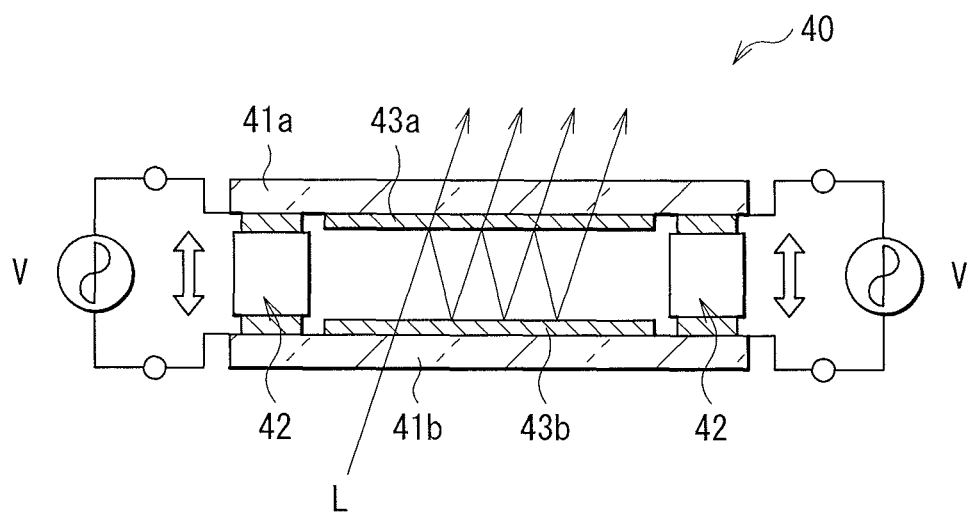
FIG. 16 is a cross-sectional diagram illustrating an outline configuration of the variable filter according to Modification 4.

FIG. 16 illustrates an outline configuration of a variable filter (a variable filter 40) according to Modification 4. In all of the above-described embodiment and Modifications 1 to 3, the liquid crystal Lyot filter has been mentioned as an example of the variable filter. However, a piezoelectric Fabry-Perot interferometer may be used as in the present modification. In this piezoelectric Fabry-Perot interferometer, for example, a piezoelectric device 42 is provided as a spacer between a pair of substrates 41a and 41b that face each other. By driving the piezoelectric device 42 with a voltage, a cell gap between the substrates 41a and 41b is allowed to be adjusted. Semi-transmissive mirrors 43a and 43b that each reflect or transmit light are attached to the respective facing faces of the substrates 41a and 41b. In such a configuration, incident light L is interfered by being reflected between the substrates 41a and 41b (between the semi-transmissive mirrors 43a and 43b), and thereby, only a selective wavelength is transmitted. At this time, by adjusting the cell gap by control of the piezoelectric device 42, it is possible to set the transmission wavelength arbitrarily. In such a manner, the variable filter 40 may be configured of the piezoelectric Fabry-Perot interferometer. Also in this case, the cell gap is varied by electric and mechanical control, and thereby, the transmission wavelength is switched. Therefore, it is possible to perform time-divisional switching between the respective wavelengths of R, G, and B. Accordingly, it is possible to acquire the time-series data of R, G, and B to generate the color image as in the above-described embodiment. Therefore, it is possible to obtain an effect equivalent to that in the above-described embodiment.

Application Examples

Figure 17:
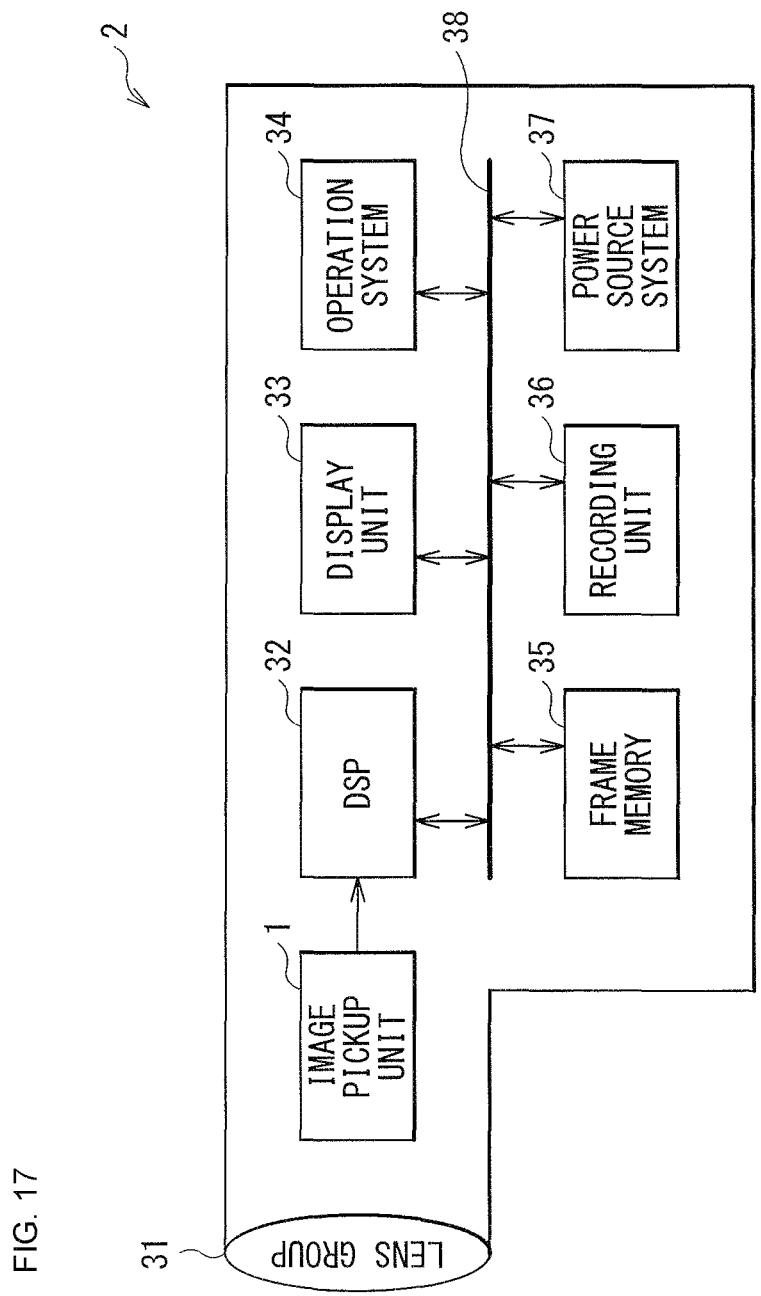
FIG. 17 is a functional block diagram of an electronic apparatus (camera) according to an application example.

The image pickup unit 1 including the configuration according to the above-described embodiment and Modifications 1 to 4 is applicable to various types of electronic apparatuses that have a shooting function, a measurement function, a display function, etc. As described above, the image pickup unit 1 is allowed to provide a color image with high image quality. Therefore, the image pickup unit 1 is suitable for a camera (a digital still camera or a video camcorder), a mobile apparatuses such as a mobile phone or a PDA (Personal Digital Assistant) having a shooting function, etc. Further, in addition thereto, the image pickup unit 1 is applicable to a measurement (detection) apparatus for a specific substance, etc. FIG. 17 illustrates a functional block configuration of a camera (a camera 2) as an example thereof.

The camera 2 includes an optical system including a lens group 31, etc., the image pickup unit 1, a DSP circuit 32 that is a camera signal processing section, a frame memory 35, a display unit 33, a recording unit 36, an operation system 34, a power source system 37, etc. Out of these, the DSP circuit 32, the frame memory 35, the display unit 33, the recording unit 36, the operation system 34, and the power source system 37 are configured to be connected to one another via a bus line 38.

The lens group 31 takes in incident light (image light) from a subject, and to form an image on an image pickup plane (the light receiving face) of the image pickup unit 1. The lens group 31 is configured of one or a plurality of lenses. The image pickup unit 1 outputs the image pickup data D0 based on the incident light that has been formed into an image on the image pickup plane by the lens group 31. The display unit 33 may be configured, for example, of a liquid crystal display unit, an organic EL (electro luminescence) display unit, or the like. The display unit 33 displays a moving image or a still image (a color image after the image processing performed by the image processing section 22) shot by the image pickup unit 1. The recording unit 36 records the moving image or the still image shot by the image pickup unit 1 on a recording medium such as a video tape and a DVD (Digital Versatile Disk). The operation system 34 serves as an external signal input means in accordance with operation by a user. The operation system 34 receives an operation instruction on various functions of the camera 2, and to transmit the received operation instruction to inside. The power source system 37 includes various power sources that serve as operation power source of the DSP circuit 32, the frame memory 35, the display unit 33, the recording unit 36, and the operation system 34.

Hereinabove, description has been given referring to the embodiment and the modifications. However, the content of the present disclosure is not limited to the above-described embodiment, and may be variously modified. For example, in the above-described embodiment and the like, the CMOS of the back illumination type or the front illumination type has been mentioned as an example of the image sensor. However, the image sensor is not limited to the CMOS, and may be a CCD (Charge Coupled Device Image Sensor) or a MOS-type image sensor.

Moreover, in the above-described embodiment and the like, description has been given on the case in which time-divisional switching between three wavelengths of R, G, and B or four wavelengths of R, G, B, and IR is performed in the variable filter to transmit them. However, the transmission wavelength of the variable filter is not limited thereto, and an arbitrary wavelength to be necessary is allowed to be set. For example, other than R, G, and B, a wavelength of yellow (for example, from 570 nm to 590 nm) or of orange (for example, from 590 nm to 620 nm) may be transmitted. Further, when the image pickup unit 1 is used for a measurement (detection) apparatus for a specific substance, a wavelength corresponding to a substance to be a target of measurement may be transmitted. As described above, in the variable filter, it is possible to adjust its transmission wavelength by electric control (or mechanical control). Therefore, the transmission wavelength is allowed to be set to a desirable transmission wavelength as necessary. Moreover, the number of wavelength for time-divisional switching is not limited to three wavelengths or four wavelengths described above, and may be two wavelengths, five wavelengths, or more.

It is to be noted that the present disclosure may have configurations described in (1) to (14) below.

(1) An image pickup unit including:
an image pickup device including a plurality of pixels and outputting an image pickup data;
a variable filter provided on a light receiving face of the image pickup device, and configured to allow a selective transmission wavelength of incident light to be variable; and
a filter drive section driving the variable filter and thereby time-divisionally switching the transmission wavelength.

(2) The image pickup unit according to the above-described (1), wherein
the plurality of pixels in the image pickup device are arranged two-dimensionally,
the variable filter includes a plurality of sub-filters each facing a pixel in the image pickup device, and
the filter drive section separately drives the plurality of sub-filters.

(3) The image pickup unit according to the above-described (1), wherein
the plurality of pixels in the image pickup device are arranged two-dimensionally,
the variable filter includes a plurality of sub-filters each facing a pixel column or a pixel row in the image pickup device, and
the filter drive section separately drives the plurality of sub-filters.

(4) The image pickup unit according to the above-described (1), wherein
the variable filter is provided integrally over all of the pixels in the image pickup device.

(5) The image pickup unit according to any one of the above-described (1) to (4), wherein
the filter drive section drives the variable filter to allow respective color light of R (red), G (green), and B (blue) to be transmitted time-divisionally.

(6) The image pickup unit according to the above-described (5), further including
an image processing section using pixel data of respective colors of R, G, and B, as the image pickup data outputted from the image pickup device at temporally-successive timings, to generate color images at respective timings.

(7) The image pickup unit according to the above-described (6), wherein
the image processing section calculates respective movement amounts of a subject between first pixel data of a wavelength of one of R, G, and B and second and third pixel data, the first pixel data being acquired at a first timing, and the second and third pixel data being acquired at second and third timings temporally subsequent to the first timing, respectively,
the image processing section generates pixel data of a wavelength corresponding to the second pixel data at the first timing, based on the movement amount of the subject between the first and the second pixel data, and
the image processing section generates pixel data of a wavelength corresponding to the third pixel data at the first timing, based on the movement amount of the subject between the first and the third pixel data.

(8) The image pickup unit according to the above-described (5), wherein
the filter drive section drives the variable filter to allow the respective color light of R, G, and B and a near-infrared ray to be transmitted time-divisionally.

(9) The image pickup unit according to the above-described (8), further including
an image processing section using pixel data of respective wavelengths of R, G, and B and of the near-infrared ray, as the image pickup data outputted from the image pickup device at temporally-successive timings, to generate color images at respective timings.

(10) The image pickup unit according to the above-described (9), wherein
the image processing section calculates respective movement amounts of a subject between first pixel data corresponding to a wavelength of one of R, G, B and a near-infrared ray, and second to fourth pixel data, the first pixel data being acquired at a first timing, and the second to fourth pixel data being acquired at second to fourth timings temporally subsequent to the first timing, respectively,
the image processing section generates pixel data of a wavelength corresponding to the second pixel data at the first timing, based on the movement amount of the subject between the first and the second pixel data,
the image processing section generates pixel data of a wavelength corresponding to the third pixel data at the first timing, based on the movement amount of the subject between the first and the third pixel data, and
the image processing section generates pixel data of a wavelength corresponding to the fourth pixel data at the first timing, based on the movement amount of the subject between the first and the fourth pixel data.

(11) The image pickup unit according to the above-described (1) to (10), wherein
the variable filter is configured of a liquid crystal Lyot filter.

(12) The image pickup unit according to the above-described (11), wherein
the liquid crystal Lyot filter is a lamination of a plurality of liquid crystal cells, and
the filter drive section applies drive voltages to the respective plurality of liquid crystal cells, and sets the transmission wavelength of the liquid crystal Lyot filter based on a combination of those drive voltages.

(13) The image pickup unit according to any one of the above-described (1) to (10), wherein
the variable filter is configured of a piezoelectric Fabry-Perot interferometer.

(14) An electronic apparatus with an image pickup unit, the image pickup unit including:
an image pickup device including a plurality of pixels and outputting an image pickup data;
a variable filter provided on a light receiving face of the image pickup device, and configured to allow a selective transmission wavelength of incident light to be variable; and
a filter drive section driving the variable filter and thereby time-divisionally switching the transmission wavelength.

It should be understood that various changes and modifications to the presently preferred embodiments described herein will be apparent to those skilled in the art. Such changes and modifications can be made without departing from the spirit and scope of the present subject matter and The invention is claimed as follows:

1. An image pickup unit comprising:
an image pickup device including a plurality of pixels;
a variable filter provided on a light receiving face of the image pickup device, the variable filter is configured to selectively transmit incident light;
a filter drive section configured to control the variable filter and control transmission wavelength of the variable filter, the first drive section includes:
a digital potentiometer configured to output a signal voltage;
an operation amplifier connected to the digital potentiometer;
a transistor connected to the variable filter;
wherein a first terminal of the transistor is connected to a selection line that is configured to provide a control signal, wherein a second terminal of the transistor is connected to an output terminal of the operation amplifier, and wherein a third terminal is connected to the variable filter.

2. The image pickup unit according to claim 1, wherein the first terminal is a gate and the second terminal is a drain or a source.

3. The image pickup unit according to claim 1, wherein the pixels are arranged two-dimensionally,
wherein the variable filter includes a plurality of sub-filters facing a pixel in the image pickup device, and
wherein the filter drive section is configured to control the sub-filters.

4. The image pickup unit according to claim 1, wherein the variable filter is provided integrally over all of the pixels.

5. The image pickup unit according to claim 1, wherein the pixels are arranged two-dimensionally,
wherein the variable filter includes a plurality of sub-filters facing at least one of a pixel column and a pixel row in the image pickup device, and
wherein the filter drive section is configured to control the sub-filters.

6. The image pickup unit according to claim 1, wherein the filter drive section is configured to control the variable filter to allow light including Red, Green, Blue, and near-infrared light to be transmitted time-divisionally.

7. The image pickup unit according to claim 6, wherein the image processing section is configured to use pixel data of the light as the image pickup data to generate color images at respective timings.

8. The image pickup unit according to claim 1, wherein the variable filter includes a liquid crystal Lyot filter.

9. The image pickup unit according to claim 8, wherein the liquid crystal Lyot filter includes a lamination including a plurality of liquid crystal cells, and
wherein the filter drive section is configured to apply voltages to the plurality of liquid crystal cells, and to set the transmission wavelength of the liquid crystal Lyot filter based on a combination of the voltages.

10. The image pickup unit according to claim 1, wherein the variable filter includes a piezoelectric Fabry-Perot interferometer.

11. The image pickup unit according to claim 1, wherein the image pickup device includes a back illumination type image sensor.

12. An electronic apparatus comprising:
an image pickup unit, the image pickup unit including:
an image pickup device including a plurality of pixels;
a variable filter provided on a light receiving face of the image pickup device, the variable filter is configured to selectively transmit incident light;
a filter drive section configured to control the variable filter and control transmission wavelength of the variable filter, the first drive section includes:
a digital potentiometer configured to output a signal voltage;
an operation amplifier connected to the digital potentiometer;
a transistor connected to the variable filter;
wherein a first terminal of the transistor is connected to a selection line that is configured to provide a control signal, wherein a second terminal of the transistor is connected to an output terminal of the operation amplifier, and wherein a third terminal is connected to the variable filter.

13. The electronic apparatus according to claim 12, wherein the first terminal is a gate and the second terminal is a drain or a source.

14. The electronic apparatus according to claim 12, wherein
the pixels are arranged two-dimensionally,
wherein the variable filter includes a plurality of sub-filters facing a pixel in the image pickup device, and
wherein the filter drive section is configured to control the sub-filters.

15. The electronic apparatus according to claim 12, wherein the variable filter is provided integrally over all of the pixels.

16. The electronic apparatus according to claim 12, wherein
the pixels are arranged two-dimensionally,
wherein the variable filter includes a plurality of sub-filters facing at least one of a pixel column and a pixel row in the image pickup device, and
wherein the filter drive section is configured to control the sub-filters.

17. The electronic apparatus according to claim 12, wherein
the filter drive section is configured to control the variable filter to allow light including Red, Green, Blue, and near-infrared light to be transmitted time-divisionally.

18. The electronic apparatus according to claim 12, wherein
the variable filter includes a liquid crystal Lyot filter.

19. The electronic apparatus according to claim 18, wherein
the liquid crystal Lyot filter includes a lamination including a plurality of liquid crystal cells, and
wherein the filter drive section is configured to apply voltages to the plurality of liquid crystal cells, and to set the transmission wavelength of the liquid crystal Lyot filter based on a combination of the voltages.

20. The electronic apparatus according to claim 12, wherein
the image pickup device includes a back illumination type image sensor.

* * * * *